United States Patent
Asukai et al.

(10) Patent No.: US 8,213,588 B2
(45) Date of Patent: Jul. 3, 2012

(54) COMMUNICATION TERMINAL, COMMUNICATION SYSTEM, SERVER APPARATUS, AND COMMUNICATION CONNECTING METHOD

(75) Inventors: Masamichi Asukai, Kanagawa (JP); Yoichiro Sako, Tokyo (JP); Toshiro Terauchi, Tokyo (JP); Makoto Inoue, Tokyo (JP); Yasushi Miyajima, Kanagawa (JP); Kosei Yamashita, Kanagawa (JP); Takatoshi Nakamura, Kanagawa (JP); Mitsuru Takehara, Tokyo (JP); Toru Sasaki, Tokyo (JP); Masafumi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 1863 days.

(21) Appl. No.: 11/391,601

(22) Filed: Mar. 28, 2006

(65) Prior Publication Data

US 2006/0233104 A1    Oct. 19, 2006

(30) Foreign Application Priority Data

Mar. 28, 2005   (JP) .................................. 2005-091633

(51) Int. Cl.
*H04M 3/42*    (2006.01)
(52) U.S. Cl. ........... 379/201.1; 379/207.05; 379/207.06; 379/207.07
(58) Field of Classification Search .................. 370/410; 600/300; 455/422.1, 405; 379/209.01, 88.13, 379/201.1, 201.01, 207.06, 207.07, 207.05; 705/1; 340/539.12
See application file for complete search history.

(56) References Cited

U.S. PATENT DOCUMENTS

| | | | |
|---|---|---|---|
| 2001/0044299 A1* | 11/2001 | Sandegren | 455/422 |
| 2002/0090926 A1* | 7/2002 | Pirkola et al. | 455/405 |
| 2002/0148477 A1* | 10/2002 | Kwoen | 128/920 |
| 2004/0147814 A1* | 7/2004 | Zancho et al. | 600/300 |
| 2005/0004923 A1* | 1/2005 | Park | 707/100 |
| 2005/0058276 A1* | 3/2005 | Oh | 379/387.01 |
| 2005/0088297 A1* | 4/2005 | Miyajima | 340/539.12 |
| 2005/0267778 A1* | 12/2005 | Kazman | 705/1 |
| 2006/0114920 A1* | 6/2006 | Jung et al. | 370/410 |

FOREIGN PATENT DOCUMENTS

| | | |
|---|---|---|
| JP | 04-043751 A | 2/1992 |
| JP | 2000-092555 A | 3/2000 |
| JP | 2000-349906 A | 12/2000 |
| JP | 2001-333184 A | 11/2001 |
| JP | 2002-009899 A | 1/2002 |
| JP | 2002-027549 A | 1/2002 |
| JP | 2002-237893 A | 8/2002 |
| JP | 2002-335336 A | 11/2002 |
| JP | 2002-354078 A | 12/2002 |
| JP | 2004-274519 | * 9/2004 |

* cited by examiner

*Primary Examiner* — Thjuan K Addy

(74) *Attorney, Agent, or Firm* — Wolf, Greenfield & Sacks, P.C.

(57) ABSTRACT

A communication terminal includes a communication unit configured to carry out communications with a communication terminal of an intended counterparty; a detector configured to detect information reflecting a status of a user of the own communication terminal; a condition checker configured to check whether a predetermined condition is satisfied by comparing information reflecting a status of a user of the communication terminal of the counterparty, received via the communication unit, with the information detected by the detector; and a controller configured to exercise control so that a communication circuit is established with the communication terminal of the counterparty via the communication unit when it is determined by the condition checker that the condition is satisfied.

5 Claims, 7 Drawing Sheets

COMMUNICATION TERMINAL, COMMUNICATION SYSTEM, SERVER APPARATUS, AND COMMUNICATION CONNECTING METHOD

CROSS REFERENCES TO RELATED APPLICATIONS

The present invention contains subject matter related to Japanese Patent Application JP 2005-091633 filed in the Japanese Patent Office on Mar. 28, 2005, the entire contents of which are incorporated herein by reference.

BACKGROUND OF THE INVENTION

1. Field of the Invention

The present invention relates to a communication terminal, such as a cellular phone terminal, a personal computer having a communication function, or a portable information terminal, a communication system including communication terminals and a server apparatus, and a communication connecting method used in the communication terminal, the server apparatus, or the communication system.

2. Description of the Related Art

Communications such as phone calls or data communications are carried out in various manners using cellular phone terminals or information communication terminals such as personal computers having communication functions. For example, according to techniques disclosed in Japanese Unexamined Patent Application Publication No. 2001-325201, a user of a mobile communication terminal can search for a counterparty satisfying a desired condition and enjoy one-to-one chatting (conversation) with the counterparty in real time.

According to techniques disclosed in Japanese Unexamined Patent Application Publication No. 2001-325201, a chat server holds personal information and condition information regarding member users. When a chat request from a user of a mobile communication terminal is received, a counterparty satisfying a condition desired by the user is searched for using personal information of the members. Then, a member for the user to enjoy chatting with is identified using condition information of members obtained through searching and condition information of the user, so that the user can enjoy chatting with the member identified.

With the techniques disclosed in Japanese Unexamined Patent Application Publication No. 2001-325201, a new way of forming a connection for chatting can be implemented. That is, it is possible to enjoy one-to-one chatting with a member roughly selected on the basis of personal information and further selected on the basis of mutual condition information. This serves to exchange effective information efficiently.

SUMMARY OF THE INVENTION

According to the techniques disclosed in Japanese Unexamined Patent Application Publication No. 2001-325201, by preparing predetermined items of information such as personal information and condition information on a chat server, it is possible to automatically select candidates of a counterparty of chatting and to select an actual counterparty from the candidates. However, a connection for communications is established in the same manner as before. That is, when a connection for communications is established, it has been the case to basically establish a connection when a device at a destination that has received a connection request is in a status where it is possible to establish a connection.

For example, in the case of a cellular phone terminal, when the cellular phone is powered on and setting for call rejection is not made, a call to the cellular phone terminal is accepted and a ring tone is produced. A communication circuit is established so that talking is allowed when a user of the called cellular phone terminal performs an off-hook operation to respond to the call.

In the case of an instant messenger, which is an application for obtaining a list of users connected to the Internet and for enjoying real-time chatting with an arbitrary user in the list, a connection is not established when a counterparty is off line, but a connection is established when a counterparty is on line.

As well as information representing "on line" or "off line", some instant messenger applications allow transmission of information representing a status of a counterpart that is "on line", such as "busy", "temporarily not at desk", "not at desk", or "lunch break".

However, unless setting for call rejection or setting for reporting a status such as "busy" or "temporarily not at desk" is made, a recipient user is notified of each call regardless of the status of the user. When setting for call rejection is made, calls to the own terminal are rejected, and ringing tones or the like are not output.

However, as for the setting for reporting a status such as "busy" or "temporarily not at desk", the setting only serves to report the status of a recipient user to a calling user, and the setting does not affect processes of communications. Furthermore, the setting for call rejection or the setting for reporting a user's status should be made consciously by a user of a recipient device.

As described above, according to schemes that have been used to establish a connection for communications, whether a recipient user is in a status where the user can respond is not automatically considered, so that a user of a communication device should consciously make laborious setting for call rejection or for status report in order to have the status taken into consideration.

It is desired that an apparatus, a system, and a method for allowing controlling establishment of a communication circuit (communication path) on the basis of information reflecting mutual statuses of users at a source and a destination of communications be provided.

According to an embodiment of the present invention, there is provided a communication terminal including communication means for carrying out communications with a communication terminal of an intended counterparty; detecting means for detecting information reflecting a status of a user of the own communication terminal; condition checking means for checking whether a predetermined condition is satisfied by comparing information reflecting a status of a user of the communication terminal of the counterparty, received via the communication means, with the information detected by the detecting means; and controlling means for exercising control so that a communication circuit is established with the communication terminal of the counterparty via the communication means when it is determined by the condition checking means that the condition is satisfied.

With the communication terminal described above, information reflecting a status of a user of a communication terminal of an intended counterparty, returned from the communication terminal of the counterparty, can be accepted via the communication means.

Then, the condition checking means checks whether a predetermined condition is satisfied by comparing the information returned from the communication terminal of the counterparty with information detected by the detecting means. The controlling means establishes a communication circuit with the communication terminal of the counterparty only when it is determined that the condition is satisfied.

As described above, it is possible to allow establishing a communication circuit only when information reflecting a status of a user of an own communication terminal and information reflecting a status of a user of a communication terminal of an intended counterparty satisfy a predetermined condition. That is, it is possible to allow establishing a communication circuit only when, for example, information reflecting a status of a user of an own communication terminal and information reflecting a status of a user of a communication terminal of an intended counterparty are the same or similar. Thus, a communication circuit can be established with a communication terminal of a counterparty with which active interaction through communications can be expected. Furthermore, at the communication terminal of the intended counterpart, unwanted connections can be avoided without responding, without executing a laborious procedure such as performing a certain setting operation.

According to another embodiment of the present invention, there is provided a communication connecting method including the steps of detecting information reflecting a status of a user of an own communication terminal; checking whether a predetermined condition is satisfied by comparing information reflecting a status of a user of a communication terminal of an intended counterparty, transmitted from the communication terminal of the counterparty, with the information detected in the detecting step; and exercising control so that a communication circuit is established with the communication terminal of the counterparty when it is determined in the condition checking step that the condition is satisfied.

According to another embodiment of the present invention, there is provided a communication system including a source communication terminal; one or more destination communication terminals; and a server apparatus connected to the source communication terminal and the destination communication terminal via a predetermined network. The source communication terminal includes detecting means for detecting source-status information reflecting a status of a user, accepting means for accepting input of an instruction by the user, and sending-information generating means for sending a connection request for establishing a communication circuit and the source-status information detected by the detecting means to the server apparatus when input of an instruction for carrying out communications is accepted via the accepting means. The server apparatus includes information accepting means for accepting the connection request and the source-status information from the source communication terminal, request generating means for generating a providing request and sending the providing request to a destination communication terminal at an intended destination on the basis of the connection request accepted via the information accepting means, the providing request requesting that destination-status information reflecting a status of a user of the destination communication terminal be provided, condition checking means for checking whether a predetermined condition is satisfied by comparing the destination-status information transmitted from the destination communication terminal in response to the providing request with the source-status information transmitted from the source communication terminal, and connection controlling means for establishing a communication circuit between the source communication terminal and the destination communication terminal when it is determined by the condition checking means that the condition is satisfied. Each of the one or more destination communication terminals includes detecting means for detecting destination-status information reflecting a status of a user, request accepting means for accepting a providing request from the server apparatus, and information returning means for sending the destination-status information detected by the detecting means to the server apparatus when the providing request from the server apparatus is accepted via the request accepting means.

According to another embodiment of the present invention, there is provided a source communication terminal in a communication system in which the source communication terminal and a destination communication terminal are connected to a server apparatus via a predetermined network. The source communication terminal includes detecting means for detecting source-status information reflecting a status of a user; accepting means for accepting input of an instruction by the user; and sending-information generating means for sending a connection request for establishing a communication circuit and the source-status information detected by the detecting means to the server apparatus when input of an instruction for carrying out communications is accepted via the accepting means.

According to another embodiment of the present invention, there is provided a server apparatus in a communication system in which a source communication terminal and one or more destination communication terminals are connected to the server apparatus via a predetermined network. The server apparatus includes information accepting means for accepting a connection request and source-status information reflecting a status of a user of the source communication terminal, the connection request and the source-status information being transmitted from the source communication terminal; request generating means for generating a providing request and sending the providing request to a destination communication terminal at an intended destination on the basis of the connection request accepted via the information accepting means, the providing request requesting that destination-status information reflecting a status of a user of the destination communication terminal be provided; condition checking means for checking whether a predetermined condition is satisfied by comparing the destination-status information transmitted from the destination communication terminal in response to the providing request with the source-status information transmitted from the source communication terminal; and connection controlling means for establishing a communication circuit between the source communication terminal and the destination communication terminal when it is determined by the condition checking means that the condition is satisfied.

According to another embodiment of the present invention, there is provided a destination communication terminal in which a source communication terminal and the destination communication terminal are connected to a server apparatus via a predetermined network. The destination communication terminal includes detecting means for detecting destination-status information reflecting a status of a user; request accepting means for accepting a providing request from the server apparatus, the providing request requesting that destination-status information be provided; and information returning means for sending the destination-status information detected by the detecting means to the server apparatus when the providing request from the server apparatus is accepted via the request accepting means.

According to another embodiment of the present invention, there is provided a communication connecting method in a communication system in which a source communication terminal and one or more destination communication terminals are connected to a server apparatus via a predetermined network. The communication connecting method comprising the steps of detecting source-status information reflecting a status of a user at the source communication terminal; sending a connection request for establishing a communication circuit and the source-status information detected in the detecting step from the source communication terminal to the server apparatus; generating a providing request at the server apparatus and sending the providing request to a destination communication terminal at an intended destination when the connection request from the source communication terminal is received, the providing request requesting that destination-status information reflecting a status of a user of the destination communication terminal be provided; detecting the destination-status information reflecting the status of the user at the destination communication terminal when the providing request from the server apparatus is received; sending the destination-status information detected from the destination communication terminal to the server apparatus; checking at the server apparatus whether a predetermined condition is satisfied by comparing the destination-status information transmitted from the destination communication terminal in response to the providing request with the source-status information transmitted from the source communication terminal; and establishing, by the server apparatus, a communication circuit between the source communication terminal and the destination communication terminal when it is determined in the condition checking step that the condition is satisfied.

According to these embodiments of the present invention, it is possible to allow establishing a communication circuit only with a communication terminal of a counterparty with which active communications can be expected. Furthermore, a user of a communication terminal at a destination can automatically avoid unwanted connections without performing any operations at the own communication terminal.

DESCRIPTION OF THE PREFERRED
EMBODIMENTS

Now, embodiments of the present invention will be described with reference to the drawings.
First Embodiment
First, a communication terminal and a communication connecting method according to a first embodiment of the present invention will be described. In the first embodiment, a communication terminal 100 has a function of playing back content data, e.g., audio data such as music, still-image data, or moving-image data. The communication terminal 100 allows establishing a communication circuit between the own communication terminal 100 and one or more terminals that act as counterparties of communications only when content is being played back by these communication terminals and information regarding the content being played back satisfies a certain condition.

In the first embodiment, a communication terminal that acts as a source of communications at a transmitting end and a communication terminal that acts as a destination of communications at a receiving end both have the configuration of the communication terminal 100 according to the first embodiment, and have a function of playing back various types of content data.

The communication terminal 100 according to the first embodiment can be applied to various types of devices, e.g., personal computers with communication functions, disposed and used at homes or other places, cellular phone terminals, or portable information communication terminals. For the simplicity of description, however, the communication terminal 100 according to the first embodiment will be described as a cellular phone terminal having a function of playing back music.

Figure 1:
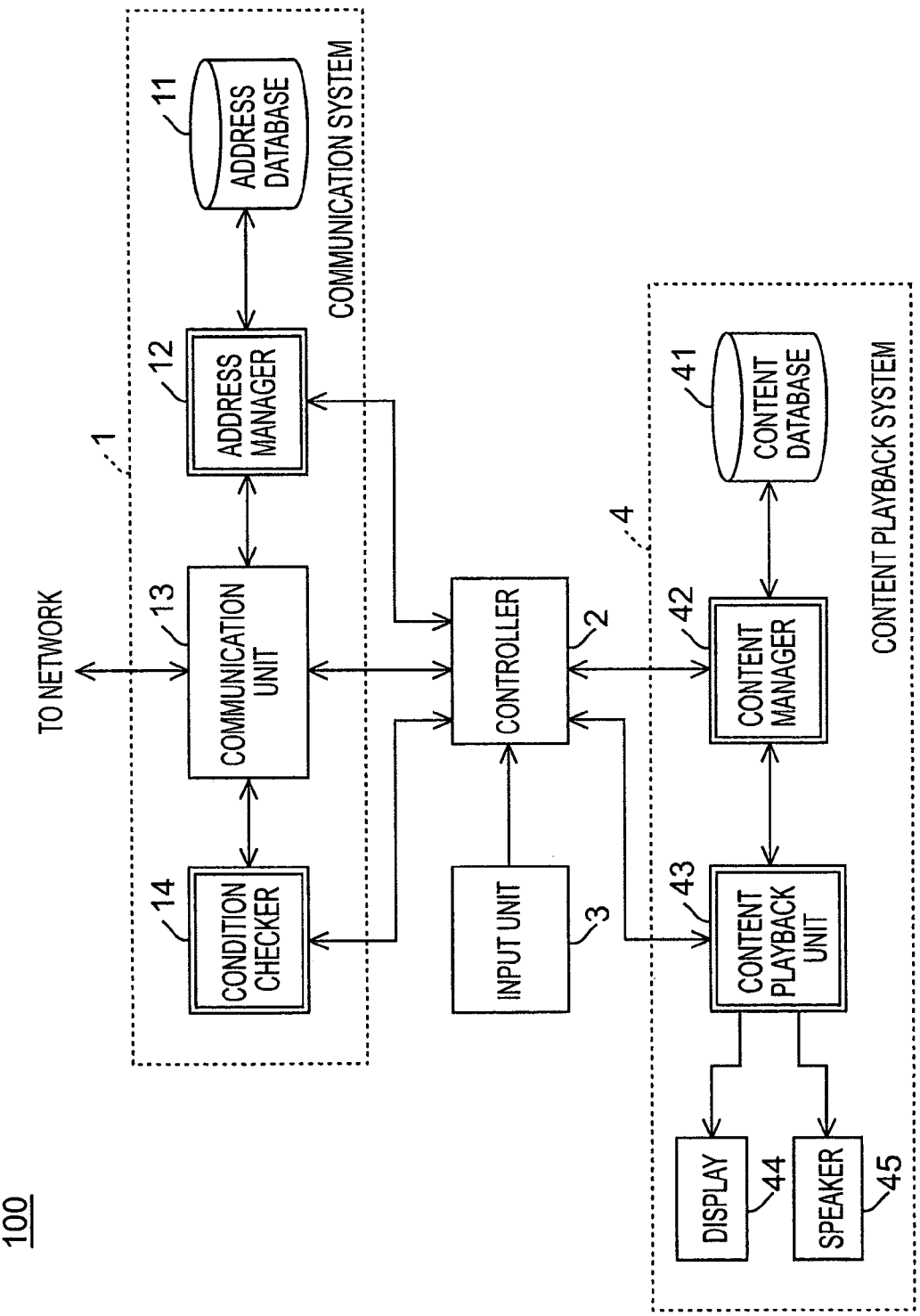
FIG. 1 is a block diagram of a communication terminal according to an embodiment of the present invention.

FIG. 1 is a block diagram of the communication terminal 100 according to the first embodiment. Referring to FIG. 1, the communication terminal 100 according to the first embodiment generally includes a communication system 1, a controller 2, an input unit 3, and a content playback system 4. The communication system 1 includes an address database 11, an address manager 12, a communication unit 13, and a condition checker 14. The content playback system 4 includes a content database 41, a content manager 42, a content playback unit 43, a display 44, and a speaker 45.

The controller 2 controls the communication terminal 100 as a whole. Although not shown, the controller 2 is implemented by a microcomputer including, for example, a central processing unit (CPU), a read-only memory (ROM), a random access memory (RAM), an electrically erasable and programmable ROM (EEPROM).

The CPU plays a main role in exercising control, such as executing programs and generating control signals supplied to other parts. The ROM stores programs executed by the CPU, data needed for processing, and so forth. The RAM is mainly used as a work area in various processes. The EEPROM is a rewritable non-volatile memory, and it stores parameters and the like that should be maintained even when power is turned off.

The input unit 3 includes various operation keys, operation switches, and the like. The input unit 3 receives input of various instructions from a user, such as an instruction for playing back content and an instruction for starting communications, converts these instructions into electronic signals, and supplies the electronic signals to the controller 2. Thus, the controller 2 can control parts of the communication terminal 100 according to the instructions input by the user via the input unit 3.

The content database 41 stores various types of content data. In the communication terminal 100 according to the first embodiment, the content database 41 is implemented, for example, using a hard disc drive including a small hard disc as a recording medium. Alternatively, various other types of drives can be used, for example, an optical disc drive that uses an optical disc as a recording medium, such as a digital versatile disc (DVD) or a compact disc (CD), a magneto-optical disc drive that uses a magneto-optical disc as a recording medium, such as a Mini Disc® (MD), or a memory drive that uses a semiconductor memory as a recording medium.

The content manager 42 executes processing for writing content data to the content database 41 or reading content data recorded in the content database 41. The content playback unit 43 decodes content data read from the content database 41 via the content manager 42, and generates video signals supplied to the display 44 and audio signals supplied to the speaker 45.

The display 44 includes a display device such as a liquid crystal display (LCD), an organic electroluminescence (EL) display, a plasma display panel (PDP), or a cathode-ray tube (CRT) display. The display 44 receives analog video signals for playback from the content playback unit 43, and displays video images corresponding to the video signals on a display screen. The speaker 45 has a function of electro-acoustic conversion. The speaker 45 receives analog audio signals from the content playback unit 43, and produces sounds corresponding to the audio signals.

In the content playback system 4 configured as described above, under the control of the controller 2, the content manager 42 reads content data that is to be played back from the content database 41 and supplies the content data to the content playback unit 43. As described earlier, the content data may be various types of data, for example, audio data, still-image data, moving-image data, or audio/visual (AV) data including audio data and moving-image data that are played back in synchronization with each other, such as television programs or movies. The following description will be given in the context of an example where AV data is read and played back.

The content playback unit 43 decodes content data supplied thereto, i.e., AV data in this example, decodes the AV data to generate analog video signals and analog audio signals, and supplies the analog video signals to the display 44 and supplies the analog audio signals to the speaker 45. Thus, video and sound corresponding to content data that is to be played back are played back and presented to the user via the display 44 and the speaker 45.

Although the above description has been given in the context of an example where AV data is played back, without limitation to AV data, for example, it is possible to play back audio data alone, such as music, or to playback still-image data or moving-image data alone. That is, the content playback unit 43 is also capable of properly executing processing, such as decoding, for playing back content data including audio data alone, content data including still-image data alone, or content data including moving-image data alone.

The address database 11 stores address information of counterparties of communications, such as names, addresses, phone numbers, and e-mail addresses. The address manager 12 writes address data to the address database 11 or read address data as needed from the address database 11.

The communication unit 13 establishes a communication circuit with a communication terminal of a counterparty of communications via a network so that, in the case of the first embodiment, talking with is allowed. Thus, although not shown, the communication unit 13 includes a receiver, a transmitter, a codec, a speaker, a microphone, a ringer circuit for generating a ring tone or an alarm, and so forth.

The condition checker 14 compares information representing a status of the user of the own communication terminal with information representing a status of a user that acts as a counterparty of communications to check whether these statuses satisfy a predetermined condition, and controls the communication unit 13 so that a communication circuit is established only when the condition is satisfied.

In the communication terminal 100 according to the first embodiment, as will be described later in detail, when communications are to be carried out while content data is being played back, the condition checker 14 checks whether content data is being played back by a communication terminal at a destination of communications and the content data being played back by the communication terminal at the destination of communications and content data being played back by the own communication terminal at the source of communications satisfy a predetermined condition, and controls the communication unit 13 so that a communication circuit is established only when the condition is satisfied.

A reason why information regarding content data being played back is used as described above is that it is presumed that the content data being played back reflects to a certain extent a status or the like of a user using the content data and that it is possible to estimate a current status of the user on the basis of the information regarding the content data.

The address database 11 allows additionally registering new address data, deleting address data that has been registered, changing address data that has been registered, and so forth, via the input unit 3, the controller 2, and the address manager 12.

Usually, when a phone call to an intended counterparty is made, upon receiving input of a user's instruction for starting communications (an instruction for initiating a call) via the input unit 3, the controller 2 controls the address manager 12 so that a phone number of the intended counterparty is read from the address database 11 and supplied to the communication unit 13. Then, the communication unit 13 initiates a call to call the intended destination (counterparty of communications). When the counterparty responds to the call, a communication circuit is established so that talking is allowed.

On the other hand, when the communication unit 13 detects a call to the own communication terminal, a ring tone is generated using, for example, a ringer of the communication unit 13, thereby notifying the user of the call. When an operation for responding to the call is performed via the input unit 3, the controller 2 controls the communication unit 13 to allow talking with the communication terminal of the counterparty that has initiated the call and established a communication circuit.

Furthermore, the communication terminal 100 according to the first embodiment is capable of downloading various types of content data from an external server apparatus or the like via a network and the communication unit 13, and storing the content data in the content database 41 via the controller 2 and the content manager 42 so that the content data can be played back and used later.

In the communication terminal 100 according to the first embodiment, when content data is being played back and used by the content playback system 4, when input of a user's instruction for carrying out communications is accepted via the input unit 3, the controller 2 controls parts of the communication system 1 to initiate a call to a destination (counterparty of communications) registered in the address database 11 to receive a reply including status information and information regarding content data being played back from a communication terminal at the destination.

When it is determined by the condition checker 14 of the communication terminal 100 that content data being played back by the own communication terminal and content data being played back at the destination of communications satisfy a predetermined condition, the call is maintained so that the counterparty is prompted to establish a communication circuit. When a user at the destination of communications performs an off-hook operation, a communication circuit is established so that talking is allowed.

On the other hand, when content data is not being played back by a communication terminal at the destination of communications, or when content data is being played back but the content data being played back by the communication terminal at the destination of communications and content data being played back by the own communication terminal (communication terminal at the source of communications) do not satisfy the predetermined condition, the call is canceled, and a communication connecting process is exited without executing a process for calling up the user of the communication terminal at the destination of communications.

The predetermined condition regarding content data herein is a condition regarding content data being played back, for example, a condition that content data being played back by the own communication terminal 100 (source of communications) is the same as content data being played back by the communication terminal of the counterparty (destination of communications), a condition that these pieces of content are of the same artist or of the same genre. These conditions are prepared in advance in the communication terminal 100, and a condition selected therefrom by the user is set in advance in the controller 2, for example, in the EEPROM.

In order to check mutual playback statuses of the communication terminal 100 at the source of communications and the communication terminal at the destination of communications, the communication terminal 100 at the source of communications includes the condition checker 14, as shown in FIG. 1, which checks whether the status of the communication terminal 100 at the source of communications and the status of the communication terminal at the destination of communications satisfy a predetermined condition.

By allowing communication terminals playing back content data satisfying the condition to establish a communication circuit as described above, the terminals have a point in common that content satisfying the condition is being played back. In this case, the consciousness of the user of each of the communication terminals is directed at least partially to the content being played back, and the content being played back satisfies the predetermined condition. Thus, the orientations of the consciousness of the users of the communication terminals are likely to be the same with or similar to each other. Therefore, smooth entry to communications and subsequent active communications can be expected.

Furthermore, since the same content, content of the same artist, content of the same genre, or the like satisfying the predetermined condition is being played back at both of the communication terminals, the same or similar topic (information) is shared even before starting communications. Since communications can be carried out between users of communication terminals sharing the same or similar topic, active communications can be expected.

That is, by carrying out communications after confirming the status of a counterparty of communications that content data is being played back and the content data being played back and content data being played back by the own communication terminal satisfy a predetermined condition (match), the communication terminal at the source of communications can carry out communications by establishing a communication circuit with a counterparty with which active communications can be expected.

Furthermore, from the viewpoint of a counterparty of communications, when content data is not being played back or when content data not satisfying the condition is being played back, a connection is not requested while content data is being played back by a communication terminal at a source of communications. Thus, a user of a communication terminal of a counterparty of communications can avoid unwanted connection requests to the own communication terminal without specifically making setting regarding call rejection or the like.

The functions of the address manager 12, the condition checker 14, the content manager 42, and the content playback unit 43, indicated by double lines in FIG. 1, can also be implemented in software executed by the controller 2.

Figure 2:
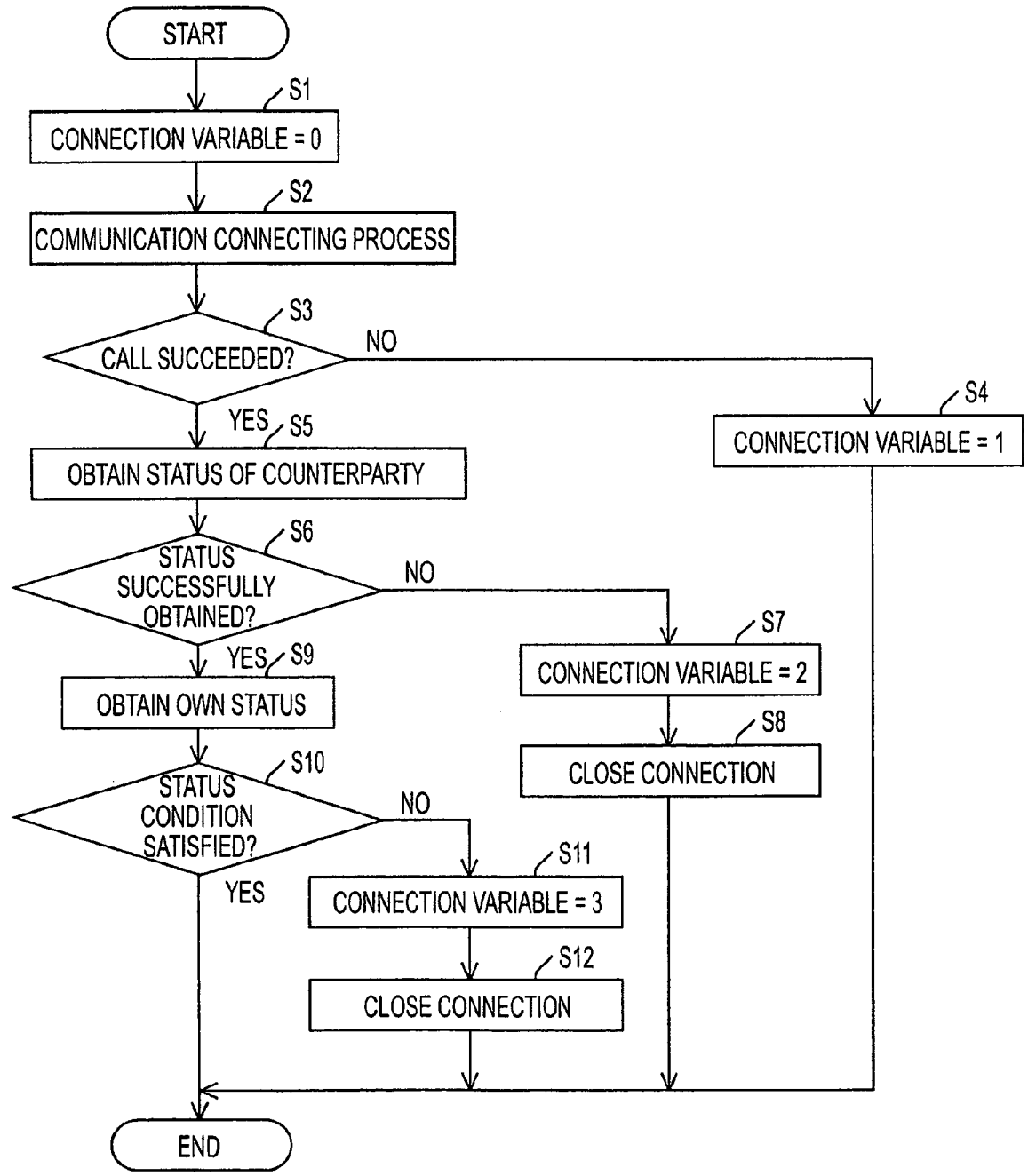
FIG. 2 is a flowchart showing an example operation of the communication terminal shown in FIG. 1.

Next, a process that is executed in a case where the communication terminal 100 according to the first embodiment shown in FIG. 1 carries out communications while playing back content data will be described in detail. FIG. 2 is a flowchart of a process that is executed mainly by the communication system 1 in a case where the communication terminal 100 shown in FIG. 1 carries out communications while playing back content data.

When a request for carrying out communications is input by the user via the input unit 3 while content data is being played back by the content playback system 4, the controller 2 issues a request for establishing a communication circuit with another terminal that is playing back content data satisfying a predetermined condition to relevant parts of the communication system 1. In response to the request, the communication system 1 starts the process shown in FIG. 2.

First, in step S1, the communication unit 13 of the communication system 1 sets a "0" to a connection variable. The connection variable represents a result of connection. A "0" indicates a success of connection, while a value other than "0" indicates a failure of connection. In response to the request from the controller 2, in step S2, the address manager 12 supplies an address (a phone number in the first embodiment) of a counterparty selected as a destination of communications from the address database 11 to the communication unit 13, and the communication unit 13 initiates a call to the phone number supplied from the address manager 12, and executes a communication connecting process for establishing a communication circuit.

In step S3, on the basis of status information or the like returned from the destination of communications, the communication unit 13 determines whether the call to the destination of communications has successfully arrived normally. When it is determined in step S3 that the call has not successfully arrived normally, for example, when status information is not returned from the destination of communications or status information representing busy status is returned, in step S4, the communication unit 13 sets a "1" to the connection variable, indicating a failure of the call. The communication unit 13 then exits the process shown in FIG. 2.

When it is determined in step S3 that the call has successfully arrived normally by at the destination of communications, the communication unit 13 sends to the destination of communications a request that status information or the like representing an operation status or the like of the communication terminal at the destination of communications be provided as information representing a user's status, thereby obtaining the status information or the like of the communication terminal at the destination of communications.

In step S5, information representing an operation status of the communication terminal at the destination of communications or information related to the operation status is obtained. For example, when the operation status indicates that content is being played back, the information related to the operation status includes a title, a content type, an artist name, a genre (content type-specific information), and so forth of the content being played back.

In the first embodiment, the status information and related information are represented in order of, for example, (status information, title, content type, artist name, genre). Thus, for example, when a piece of music "YYYYYYYYYY" of a contemporary music artist "XXXXXX" is being listened to, the status information and the related information are (playback, YYYYYYYYYY, music, XXXXXX, contemporary music).

Then, in step S6, the communication unit 13 determines whether the status information and related information of the destination of communications has been successfully obtained on the basis of the information supplied from the destination of communications. When it is determined in step S6 that the status information and related information of the communication terminal at the destination of communications has not been successfully obtained (i.e., a failure), in step S7, the communication unit 13 sets a "2" to the connection variable, indicating a failure of obtainment of status information. Then, in step S8, the communication unit 13 executes a communication closing process for canceling the process for establishing a communication circuit, started in step S2. The communication unit 13 then exits the process shown in FIG. 2.

When it is determined in step S6 that the status information and related information of the communication terminal at the destination of communications has been successfully obtained, in step S9, the communication unit 13 obtains status information and information related thereto of the own communication terminal via the controller 2, and supplies the status information related information to the condition checker 14. In step S10, the condition checker 14 compares the status information and related information of the communication terminal at the destination of communications, obtained in step S5, with the status information and related information of the own communication terminal, obtained in step S9, to check whether the predetermined condition is satisfied.

The predetermined condition is set in advance by the user to the communication terminal 100. As described earlier, the predetermined condition is, for example, "matching of title", "matching of content type", "matching of artist", or "matching of genre". Obviously, other conditions may be set. For example, it is possible to set a combination of conditions.

Let it be assumed that it is determined in step S5 that the information obtained from the communication terminal at the destination of communications is (playback, YYYYYYYYYY, music, XXXXXX, contemporary music) and, for example, music entitled as "AAAAAAAAAA" by a contemporary music artist "BBBBBB" is being played back by the own communication terminal at the source of communications, so that a status of (playback, AAAAAAAAAA, music, BBBBBB, contemporary music) is obtained in step S9 as the status information and related information of the own communication terminal.

In this case, when the predetermined condition is "matching of title" or "matching of artist", the condition is not satisfied. When the predetermined condition is "matching of genre", the condition is satisfied.

When it is determined in step S10 that the condition is not satisfied, in step S11, a value of "3" is set to the connection variable, indicating a mismatch of the condition. Then, in step S12, the communication unit 13 executes a communication closing process for canceling the process for establishing a communication circuit, started in step S2. The communication unit 13 then exits the process shown in FIG. 2. When it is determined in step S10 that the condition is satisfied, the connection variable is maintained at "0" so that the call to the destination of communications is maintained to wait for a response to the call by the user of the communication terminal at the destination of communications. When the user at the destination of communications responds by performing an off-hook operation, a communication circuit is established so that talking is allowed.

As described above, the communication terminal 100 according to the first embodiment initiates a call to a communication terminal at an intended destination of communications, and obtains status information and information related thereto from the communication terminal at the destination of communications. On the basis of the status information and related information obtained and status information and related information of the own communication terminal, the communication terminal 100 establishes a connection circuit so that talking is allowed only when a predetermined condition is satisfied between the own communication terminal at the source of communications and the communication terminal at the destination of communications. When the predetermined condition is not satisfied, the process for establishing communications is canceled so that a call-up process for notifying the user of the call at the communication terminal at the destination of communications, such as activation of a ringer, is not executed.

Furthermore, as described earlier, the communication terminal at the destination of communications is supposed to be capable of obtaining its own status information and related information and returning the status information and related information to the communication terminal 100 at the source of communications when a request that the status information be provided is received from the communication terminal 100 at the source of communications. Since a controller of a communication terminal is usually aware of and is managing its own operation status, it suffices for the communication terminal to obtain and return information related to the operation status. This is possible simply by adding or modifying software without adding a new circuit.

The communication terminal 100 according to the first embodiment is also capable of returning status information and related information. Thus, by using communication terminals according to the first embodiment at both a source and a destination of communications, the process shown in FIG. 2 can be executed whether which of the communication terminals acts as a source or a destination of communications.

The communication connecting process described with reference to FIG. 2 can be requested in two modes. One is a mode in which an address of a destination of connection is explicitly specified, and the other is a mode in which a group of addresses of destinations of connection is specified. In the former mode, the user specifies an address of a counterparty for establish a connection therewith. A connection is established only when a predetermined condition is satisfied, for example, when the genre of music the counterparty is listening to is the same as the genre of music the user is listening to.

In the latter mode, the user specifies a group of addresses of counterparties. For example, when a group of addresses of friends is specified, an attempt is made to establish a connection in order from the first address in the group. A connection is established only when a predetermined condition is satisfied, for example, when the title of music a counterparty is listening to is the same as the title of music the user is listening to. When a connection is not established, an attempt is made to connect to a next address after a predetermined interval. This is repeated until a connection is established with a counterparty.

As described above, the communication terminal 100 according to the first embodiment, before carrying out communications, checks the status of a counterparty of communications to confirm that content data is being played back and the content data being played back and content data being played back by the own communication terminal satisfy a predetermined condition (match). Thus, the communication terminal at the source of communications can establish a communication circuit with a counterparty with which active communications can be expected.

Furthermore, from the viewpoint of the counterparty of communications, for example, when content data is not being played back or when content data not satisfying the condition is being played back, a connection is not requested while content data is being played back at the source of communications. Thus, the user of the communication terminal that serves as a counterparty of communications can avoid unwanted connection requests to the own communication terminal without specifically making setting regarding call rejection or the like.

Second Embodiment

Next, a communication terminal and a communication connecting method according to a second embodiment of the present invention will be described. A communication terminal 200 according to the second embodiment has a function of detecting bio-information, such as a cardiac rate, a pulse rate, perspiration, breath, brain waves, motion, gait, or the like. The communication terminal 200 establishes a connection only when bio-information of users, detected at the own communication terminal and one or more communication terminals that act as counterparties of communications, satisfies a predetermined condition.

That is, in the second embodiment, a communication terminal of a source of communications at a transmitting end and a communication terminal of a destination of communications at a receiving end both have the configuration of the communication terminal 200 according to the second embodiment described below, and both have a function of detecting bio-information of a user.

Furthermore, also in the second embodiment, similarly to the first embodiment described above, the communication terminal 200 can be applied to various devices, such as personal computers with communication functions, disposed at homes or other places, cellular phones, or portable information communication terminals. For the simplicity of description, however, the communication terminal 200 according to the second embodiment will be described in the context of a cellular phone terminal having a function of detecting bio-information of a user.

Figure 3:
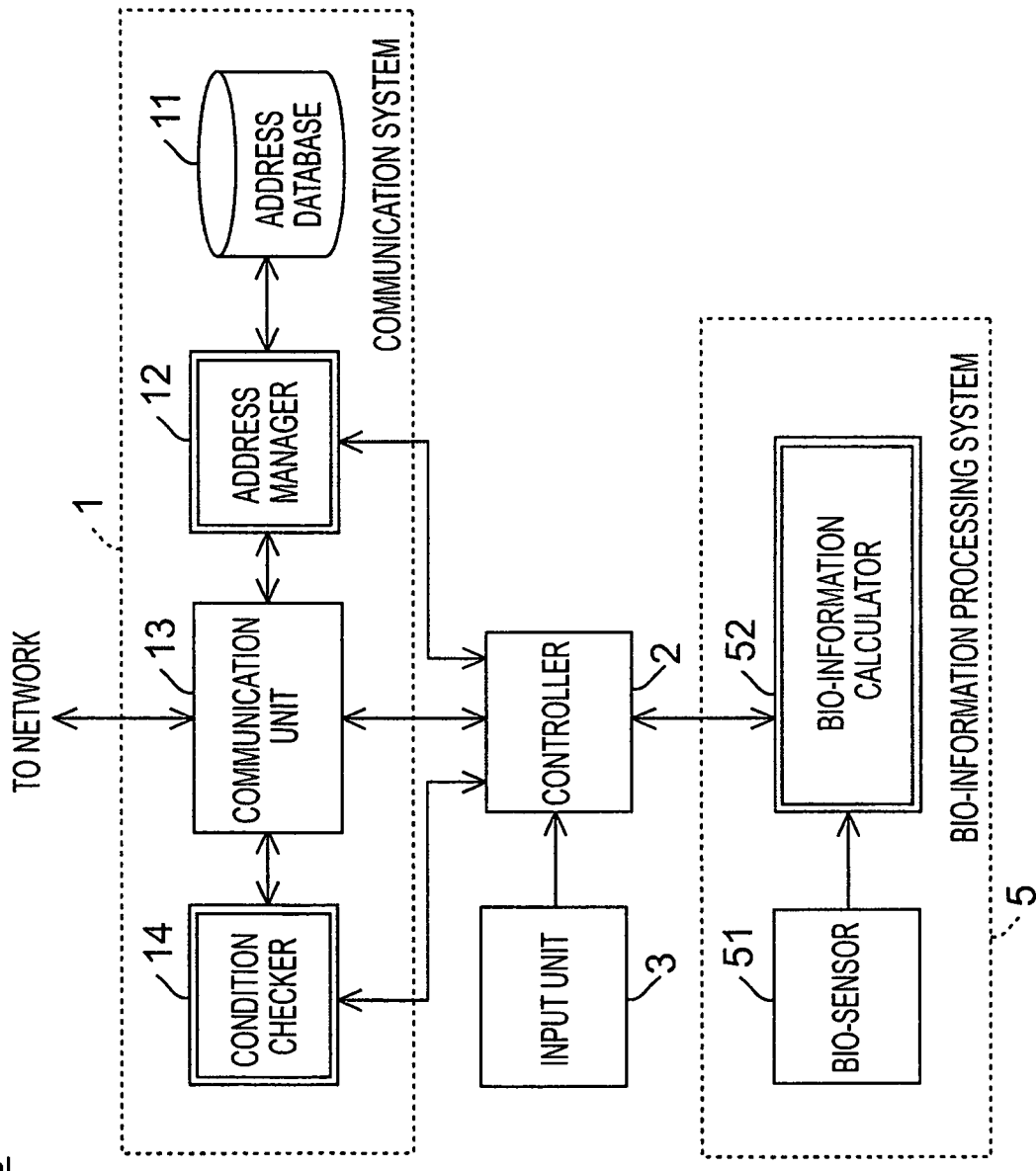
FIG. 3 is a block diagram of a communication terminal according to another embodiment of the present invention.

FIG. 3 is a block diagram of the communication terminal 200 according to the second embodiment. Referring to FIG. 3, the communication terminal 200 according to the second embodiment generally includes a communication system 1, a controller 2, an input unit 3, and a bio-information processing system 5. The components other than the bio-information processing system 5, i.e., the communication system 1, the controller 2, and the input unit 3, are configured the same as the corresponding components of the communication terminal 100 according to the first embodiment shown in FIG. 1.

Thus, regarding the communication terminal 200 according to the second embodiment shown in FIG. 3, the components configured the same as the corresponding components of the communication terminal 100 according to the first embodiment shown in FIG. 1 are designated by the same numerals, and repeated descriptions thereof will be refrained. The following description will be directed mainly to functions and other points that differ.

As shown in FIG. 3, the bio-information processing system 5 includes a bio-sensor 51 and a bio-information calculator 52. The bio-sensor 51 detects intended biological data of a user, converts the bio-information into an electric signal, and supplies the electric signal to the bio-information calculator 52. As described earlier, the biological data detected may be various types of information obtained from the body of the user, such as a cardiac rate, a pulse rate, perspiration, breath, brain waves, motion, or gait.

The bio-sensor 51 is capable of detecting at least one of the various types of biological data described above. The bio-sensor 51 can be implemented using various types of sensors as needed, such as a charge sensor, a current sensor, a capacitance sensor, an electromagnetic induction sensor, a pressure sensor, an acceleration sensor, a shock sensor, or a direction sensor.

Upon receiving a sensor output from the bio-sensor 51, the bio-information calculator 52 converts the sensor output into a digital signal, and executes processing such as a predetermined operation, thereby calculating intended bio-information, such as a cardiac rate, a pulse rate, a status of perspiration, a rate of breathing, a status of brain waves, the presence or absence of motion of the body, a status of motion (direction, speed, etc.), a manner of walking (tempo, speed, etc.). The bio-sensor 51 then supplies the bio-information of the user obtained by the calculation to the controller 2.

The bio-information of the user of the communication terminal 200, reported to the controller 2, is also supplied to the condition checker 14. In the communication terminal 200 according to the second embodiment, the condition checker 14 checks whether a predetermined condition is satisfied between bio-information of a user of the own communication terminal at the source of communications and bio-information of a user of a communication terminal at a destination of communications so that a communication circuit is established only when bio-information of these parties satisfies the predetermined condition.

In the communication terminal 200 according to the second embodiment, when the user is measuring the user's own bio-information using the function of the bio-information processing system 5 and wishes to carry out communications, a process for initiating a call and establishing a communication circuit is executed, and a communication circuit is maintained so that talking is allowed when the bio-information of the user at the source of communications and bio-information of a user at a destination of communications satisfy a predetermined condition. That is, as described earlier, the communication terminal at the source of communications and the communication terminal at the destination of communications both have the configuration and functions of the communication terminal 200 according to the second embodiment shown in FIG. 3, so that it is possible to carry out communications while measuring bio-information of the user.

In this way, for example, when a plurality of users is similarly jogging or when the heartbeats of a plurality of users have similarly become rapid through jogging, a communication circuit is established between users with similar statuses of bio-information. Since users with similar statuses of bodies are likely to be in similar statuses both physically and mentally, active communications can be promoted.

As described above, the bio-information of the user of the communication terminal 200 reflects a status of the user. When the bio-information of the user of the communication terminal at the source of communications and the bio-information of the user of the communication terminal at the destination of communications are the same or similar, it is expected that these users are in similar statuses. This serves to determine whether to establish a communication circuit.

The functions of the address manager 12, the condition checker 14, and the bio-information calculator 52, indicated by double lines in FIG. 3, can also be implemented in software executed by the controller 2.

Next, a process executed when the communication terminal 200 according to the second embodiment shown in FIG. 3 carries out communications while detecting bio-information. The process is substantially the same as the communication connecting process shown in FIG. 2, so that description will be given also with reference to FIG. 2.

When bio-information of the user is detected via the bio-information processing system 5, upon receiving a request for carrying out communications from the user via the input unit 3, the controller 2 issues a request to relevant parts of the communication system 1 so that a communication circuit is established with a communication terminal of a user with bio-information satisfying a predetermined condition. In response to the request, the communication system 1 starts the process shown in FIG. 2.

In step S1, the communication unit 13 sets a value of "0" to the connection variable. In step S2, the communication unit 13 executes a process for initiating a call to a communication terminal at an intended destination of communications using an address (phone number in the second embodiment) read from the address database 11 by the address manager 12 and for establishing a communication circuit. As described earlier, the connection variable is a variable representing a result of connection. A "0" indicates a success of connection, and values other than "0" indicate a failure of connection.

In step S3, the communication unit 13 checks whether the call has successfully arrived normally at the destination of communications on the basis of status information and the like returned from the destination of communications. When it is determined in step S3 that the call has not successfully arrived normally, for example, when status information is not returned from the destination of communications or when status information representing a busy status is returned, in step S4, the communication unit 13 sets a value of "1" to the connection variable, indicating a failure of connection. The communication unit 13 then exits the process shown in FIG. 2.

When it is determined in step S3 that the call has successfully arrived normally at the destination of communications, in step S5, the communication unit 13 issues a request to the communication terminal at the destination of communications that bio-information of the user of the communication terminal at the destination of communications be provided, thereby obtaining bio-information of the user of the communication terminal at the destination of communications.

The content of the bio-information includes information representing a type of the bio-information and a value of the bio-information. For example, when the bio-information is a cardiac rate, the bio-information is represented as (cardiac rate: 86.2). When a plurality of pieces of bio-information is detected, a set of bio-information including information representing a type of bio-information and a value of the bio-information is generated for each piece of bio-information, such as (bio-information name 1: value 1, bio-information name 2: value 2), which is supplied to the controller 2.

Then, in step S6, on the basis of information returned from the destination of communications, the communication unit 13 checks whether status information (bio-information in the second embodiment) of the destination of communications has been obtained successfully. When it is determined in step S6 that the bio-information of the user at the destination of communications has not be obtained successfully, in step S7, the communication unit 13 sets a value of "2" to the connection variable, indicating a failure of obtainment of status information. Then, in step S8, the communication unit 13 executes a communication closing process to cancel the process for establishing a communication circuit, started in step S2. The communication unit 13 then exits the process shown in FIG. 2.

When it is determined in step S6 that bio-information has been successfully received from the destination of communications, in step S9, bio-information of the user of the own communication terminal is obtained. At this time, bio-information detected via the bio-information processing system 5 is obtained by the condition checker 14 via the controller 2. Let it be supposed in this case, for example, that a status (bio-information) of (cardiac rate: 68.5) is obtained.

In step S10, the condition checker 14 compares the bio-information of the user of the communication terminal at the destination of communications, obtained in step S5, with the bio-information of the own communication terminal, obtained in step S9, to check whether these pieces of bio-information satisfies a predetermined condition. Also in the second embodiment, the predetermined condition is set in advance by the user to the communication terminal 200. The predetermined condition is, for example, a difference in cardiac rate, a difference in pulse rate, or the like, in accordance with the type of bio-information used for comparison.

For example, when a condition of "cardiac rate difference: 10" is set, in the case of the example described above, the bio-information of the source of communications is (cardiac rate: 68.5) and the bio-information of the destination of communications is (cardiac rate: 86.2). Since the condition is not satisfied, in step S11, a value of "3" is set to the connection variable, indicating that the condition is not satisfied. In step S12, the communication unit 13 executes a connection closing process. The communication unit 13 then exits the process shown in FIG. 2.

When it is determined in step S10 that the condition is satisfied, the process shown in FIG. 2 is exited with the connection variable maintained at "0", so that the communication circuit established between the own communication terminal 200 the communication terminal from which bio-information satisfying the condition is returned is maintained so that talking is allowed.

Although the description has been given in the context of an example where cardiac rate is used as bio-information for comparison, other types of bio-information, such as the status of perspiration, the rate of breathing, or the status of brain waves, can be used similarly. Similarly, it is possible to detect data (biological data) in accordance with walking by the user using an acceleration sensor or the like and to process the data, so that a tempo (rhythm) of the walking of the user is calculated. The tempo of walking can be used as bio-information for comparison so that a communication circuit can be established with a counterparty with the same tempo of walking to allow talking.

Also in the second embodiment, the communication connecting process described with reference to FIG. 2 can be requested in two modes. One is a mode is which an address of a destination of connection is explicitly specified. The other is a mode in which an address group of destinations of connection is specified. In the former mode, the user attempts to establish a connection by specifying an address of a counterparty at a destination. For example, it is possible to allow establishing a connection with a counterparty only when the tempo of jogging of the counterparty is substantially the same as the tempo of jogging of the user.

In the latter mode, the user specifies an address group of counterparties. For example, when an address group of friends is specified, an attempt for connection is made in order from the first address in the group. For example, a connection with a counterparty is established only when the tempo of jogging of the counterparty is substantially the same as the tempo of jogging of the user. When a connection is not established, an attempt to connect to a next address is made after a predetermined interval. This is repeated until a connection is established with a counterparty.

In the case of the latter mode, i.e., when the user specifies an address group of counterparties and searches for a counterparty within the group to establish a communication circuit, a plurality of candidates exists for establishing a communication circuit therewith. Thus, after establishing a communication circuit, when the bio-information of the user of the own communication terminal and the bio-information of the user of the counterparty no longer satisfies the predetermined condition, it is possible to disconnect the communication circuit and to newly establish a communication circuit with a communication terminal with bio-information satisfying the condition.

Thus, when a communication circuit is established by searching for a counterparty of communications within a group, a process is executed for automatically disconnecting the communication circuit when bio-information of the user of the own communication terminal and bio-information of the user of the communication terminal at the destination of communications no longer satisfies the predetermined condition.

Figure 4:
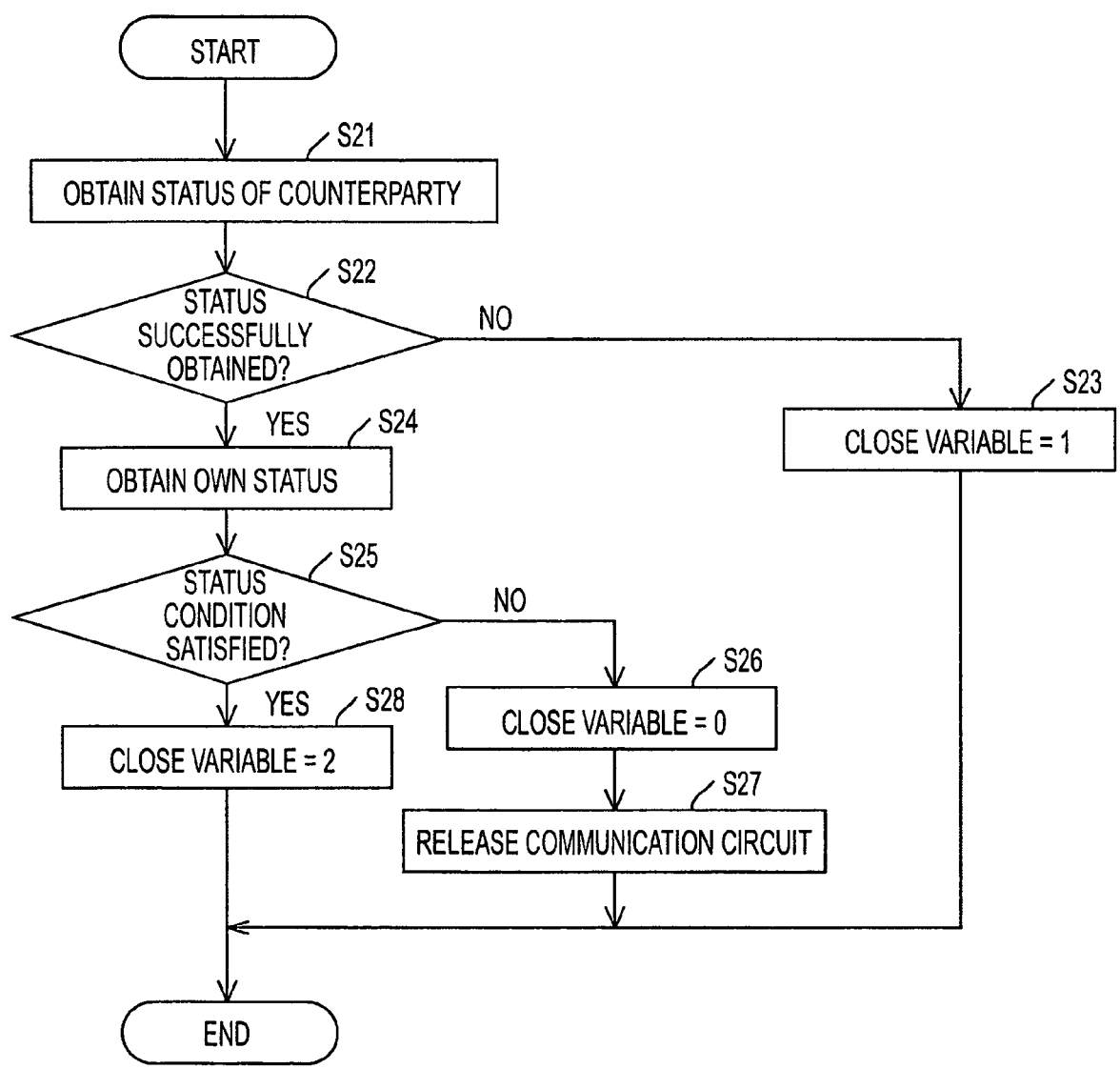
FIG. 4 is a flowchart showing an example of a process of closing an established communication circuit, executed by the communication terminal shown in FIG. 3.

FIG. 4 is a flowchart of an automatic communication closing process that is executed by the communication terminal 200 according to the second embodiment in a case where a communication circuit is established by searching for a counterparty of communications within the group. The process shown in FIG. 4 is repeated at predetermined timings after a communication circuit is established while the communication circuit is maintained.

In the automatic communication closing process shown in FIG. 4, as will be described below, a close variable representing a status of a communication circuit, mainly indicating a status where a communication circuit is closed, is used. To the close variable, a value of "0" is set when a process for closing a communication circuit in connection is executed, a value of "1" is set when a communication circuit is already closed, and a value of "2" is set when a connection is maintained.

After establishing a communication circuit with a communication terminal of an intended counterparty of communications through the communication connecting process described with reference to FIG. 2, the communication unit 13 and the condition checker 14 of the communication system 1 executes the process shown in FIG. 4 at predetermined timings under the control of the controller 2. In step S21, the communication unit 13 sends a request to the communication terminal at the destination of communications that bio-information be provided. Then, the communication system 1 receives the bio-information of a user of the communication terminal at the destination of communications, and supplies the bio-information to the condition checker 14.

In step S22, the communication unit 13 checks whether bio-information has been obtained. When it is determined that bio-information has not been obtained, in step S23, the communication system 1 sets a value of "1" to the close variable, indicating that the communication circuit has already been closed. The communication system 1 then exits the process shown in FIG. 4.

When it is determined in step S22 that the bio-information of the user at the destination of communications has been received, in step S24, the communication unit 13 controls the condition checker 14 so that the condition checker 14 obtains bio-information of the user of the own communication terminal via the controller 2. Then, in step S25, the condition checker 14 compares the bio-information of the user of the own communication terminal, obtained in step S24, with the bio-information of the user at the destination of communications, obtained in step S21, to determine whether the predetermined condition is satisfied.

When it is determined in step S25 that the condition is not satisfied, the communication unit 13 considers that at least one of the bio-information of the user of the own communication terminal and the bio-information of the user at the destination of communications has changed so that the condition is no longer satisfied. Then, in step S26, the communication unit 13 sets a "0" to the close variable, indicating that processing for closing communications is to be executed. Then, in step S27, the communication unit 13 executes a communication closing process to release the communication circuit established. The communication unit 13 then exits the process shown in FIG. 4.

When it is determined in step S25 that the condition is satisfied, in step S28, the communication unit 13 determines that the communication circuit established be maintained, and sets a value of "2" to the close variable, indicating that the communication circuit is maintained. The communication unit 13 then exits the process shown in FIG. 4.

When the close variable has a value of "0" or "1", the controller 2 executes the communication connecting process described with reference to FIG. 2 to newly establish a communication circuit with a communication terminal of a user with bio-information satisfying the predetermined condition. Thus, it is possible to constantly carry out communications with a counterparty with bio-information satisfying a predetermined condition in relation to bio-information of the user of the own communication terminal.

As described above, by executing the communication connecting process described with reference to FIG. 2 and the automatic communication closing process described with reference to FIG. 4, a connection for communications is maintained only while the status of a counterparty and the own status satisfies a condition, so that a communication circuit is established and communications are carried out only between communication terminals of users with bio-information satisfying the condition.

For example, when a user is jogging at a normal tempo, a connection is formed with another user jogging at the same tempo, and when the user is jogging at a fast tempo or a slow tempo, a connection is formed with another user jogging at the same tempo. That is, a connection is formed with communication terminals of various people in accordance with the speed of jogging so that communications can be carried out between users exercising at matching tempos. Thus, active communications can be expected.

As described above, the communication terminal 200 according to the second embodiment allows communications with a communication terminal of a user in a status similar to the status of the body of the user of the own communication terminal. Thus, a communication terminal at a source of communications can establish a communication circuit and carry out communications with a counterparty with which active communications can be expected. Typically, when a user is doing exercise involving change in bio-information, such as walking, jogging, or running, communications can be carried out with a counterparty doing corresponding exercise. This serves to improve duration or efficiency of the exercise.

From the viewpoint of a counterparty at a destination of communications, connection requests from a party in a status of body different from the own status of body can be avoided. Thus, the counterparty at the destination of communications can avoid unwanted connection requests to the own communication terminal without specifically making setting regarding call rejection or the like.

Third Embodiment Next, a communication terminal and a communication connecting method according to a third embodiment of the present invention will be described. A communication terminal 300 according to the third embodiment has a function of playing back content data, for example, audio data such as music, still-image data, or moving-image data. Furthermore, the communication terminal 300 has a function of detecting bio-information of a user thereof, such as a cardiac rate, perspiration, breath, brain waves, motion, or gait. The communication terminal 300 establishes a connection only when the status of content being played back at the own communication terminal and one or more communication terminals that act as counterparties of communications and bio-information of users detected at the own communication terminal and the one or more communication terminals that act as counterparties of communications both satisfy predetermined conditions.

That is, in the third embodiment, a communication terminal on a transmitting end at a source of communications and a communication terminal on a receiving end at a destination of communications both have the configuration of the communication terminal 300 according to the third embodiment described below, and both have a function of playing back various types of content data and a function of detecting bio-information of a user.

Similarly to the first and second embodiments described earlier, the communication terminal 300 according to the third embodiment can be applied to various devices, for example, personal computers with communication functions, disposed at homes or other places, cellular phone terminals, or mobile information communication terminals. For the simplicity of description, however, the communication terminal 300 will be described as a cellular phone terminal having a function of playing back content and a function of detecting bio-information of a user.

Figure 5:
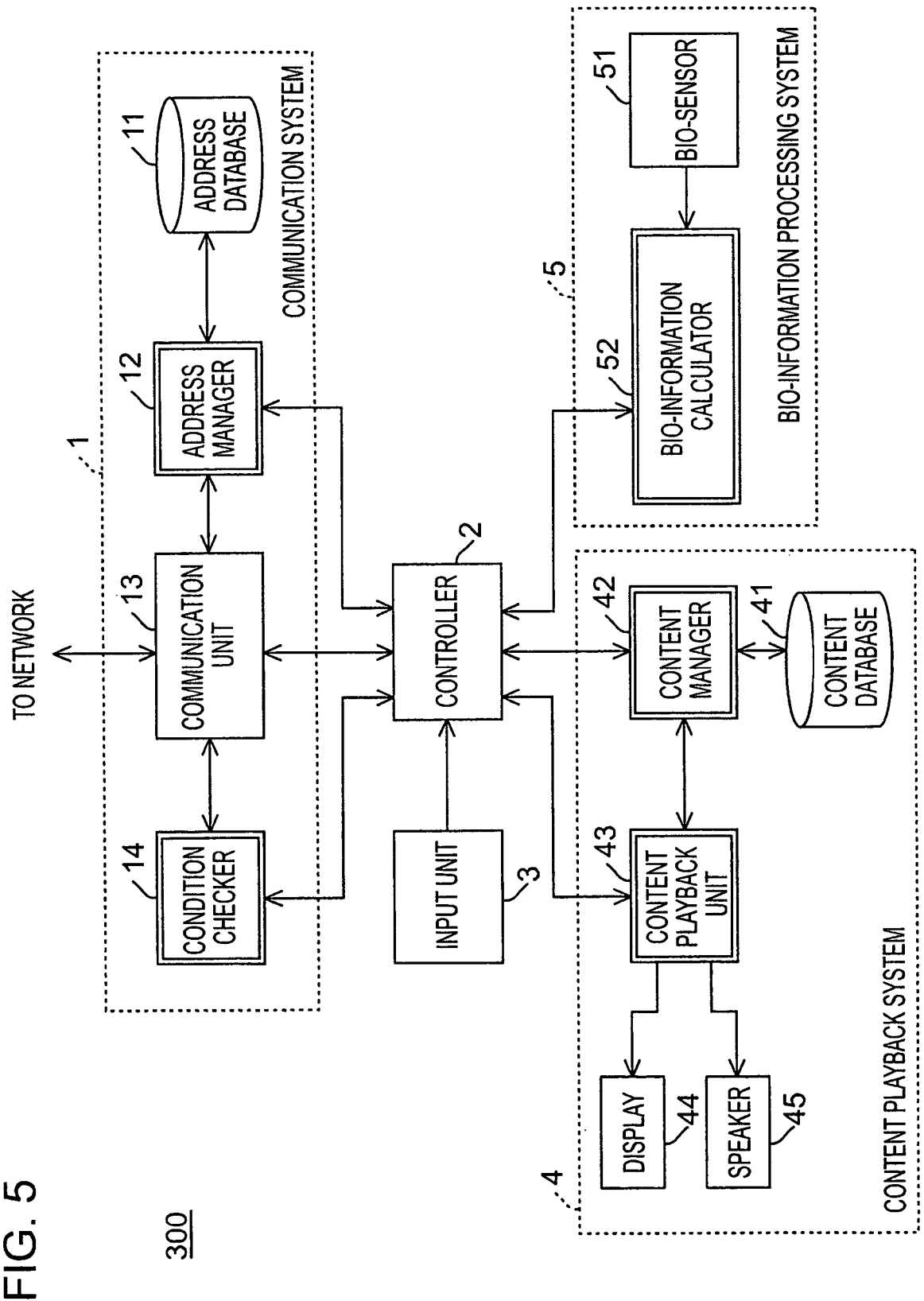
FIG. 5 is a block diagram of a communication terminal according to another embodiment of the present invention.

FIG. 5 is a block diagram of the communication terminal 300 according to the third embodiment. Referring to FIG. 5, the communication terminal 300 according to the third embodiment generally includes a communication system 1, a controller 2, an input unit 3, a content playback system 4, and a bio-information processing system 5. That is, the communication terminal 300 has both the functions of the communication terminal 100 shown in FIG. 1 according to the first embodiment and the functions of the communication terminal 200 according to the second embodiment shown in FIG. 3.

Thus, in the communication terminal 300 shown in FIG. 5, parts configured the same as corresponding parts of the communication terminal 100 according to the first embodiment shown in FIG. 1 and parts configured the same as corresponding parts of the communication terminal 200 according to the second embodiment shown in FIG. 3 are designated by the same numerals, and descriptions thereof will be omitted. The following description will be directed mainly to functions and other points that differ.

The communication terminal 300 according to the third embodiment, using the functions of the communication unit 13, the condition checker 14, and so forth, obtains operation status information, information related to the operation status information, and bio-information of a user of a communication terminal at a destination of communications for establishing a communication circuit and carrying out communications therewith, also obtains operation status information, information related to the operation status information, and bio-information of a user of the own communication terminal, and establishes a communication circuit only when the status information, related information, and bio-information of these communication terminals satisfy a predetermined condition.

Thus, users of communication terminals playing back the same content or related content can establish a communication circuit when the cardiac rates of the users are greater than or equal to a predetermined value so that it is assumed that the users are excited and their heartbeats are rapid. Thus, communications can be carried out between users with similar feelings about the same content or related content, so that active communications can be expected.

The functions of the address manager 12, the condition checker 14, the content manager 42, the content playback unit 43, and the bio-information calculator 52, indicated by double lines in FIG. 5, can also be implemented in software executed by the controller 2.

Next, a process that is executed in a case where communications are carried out when content is being played back and bio-information is detected by the communication terminal 300 according to the third embodiment shown in FIG. 5. The communication terminal 300 according to the third embodiment executes basically the same communication connecting process shown in FIG. 2, so that the following description will be given also with reference to FIG. 2.

When content data is being played back via the content playback system 4 and bio-information of a user is detected via the bio-information processing system 5, upon receiving a request for carrying out communications from a user via the input unit 3, the controller 2 issues a request to relevant parts of the communication system 1 so that a communication circuit is established with a communication terminal of a user playing back content data satisfying a predetermined condition and having bio-information satisfying a predetermined condition. In response to the request, the communication system 1 starts the process shown in FIG. 2.

First, in step S1, the communication unit 13 of the communication system 1 sets a "0" to the connection variable. The connection variable represents a result of connection, and a "0" is set when a connection succeeds while a value other than "0" is set when a connection fails. Then, in step S2, in response to the request from the controller 2, the address manager 12 supplies an address (phone number) of a counterparty selected as a destination of communications from the address database 11 to the communication unit 13, and the communication unit 13 executes processing for initiating a call to the phone number supplied from the address manager 12 to establish a communication circuit.

In step S3, the communication unit 13 checks whether the call has successfully arrived normally at the destination of communications on the basis of status information or the like returned from the destination of communications. When it is determined in step S3 that the call has not successfully arrived normally, for example, when status information is not returned from the destination of communications or when status information representing a busy status is returned, in step S4, the communication unit 13 sets a value of "1" to the connection variable, indicating a failure of the call. The communication unit 13 then exits the process shown in FIG. 2.

When it is determined in step S3 that the call has successfully arrived normally at the destination of communications, in step S5, the communication unit 13 issues a request to the destination of communications that status information representing an operation status or the like of the communication terminal at the destination, related information, and bio-information be provided, thereby obtaining the status information, related information, and bio-information of the communication terminal at the destination of communications.

In the third embodiment, status information, related information, and bio-information are obtained. That is, operation status information and information regarding content being played back, such as a title, a content type, an artist name, and a genre, are obtained similarly to the case of the communication terminal 100 according to the first embodiment, and information representing a type of bio-information and a value of the bio-information are obtained similarly to the case of the communication terminal 200 according to the second embodiment. For example, the content of the status information and the like is "(status, title, content type, content type-specific information), and the content of the bio-information is "bio-information name 1: value 1, bio-information name 2: value 2).

For example, when a piece of music entitled as "YYYYYYYYYY" by a contemporary music artist "XXXXXX" is being played back by the content playback system 4 of the communication terminal 300 according to the third embodiment and it is detected by the bio-information processing system 5 that the cardiac rate of a user listening to the piece of music is 86.2, information obtained is ((playback, YYYYYYYYYY, music, XXXXXX, contemporary music), (cardiac rate, 86.2)).

In step S6, the communication unit 13 checks whether the status information, related information, and bio-information has been successfully received from the destination of communications on the basis of information returned from the destination of communications. When it is determined in step S6 that the status information, related information, and bio-information of the communication terminal at the destination of communications have not been received successfully, in step S7, the communication unit 13 sets a value of "2" to the connection variable, indicating a failure of obtainment of status information and so forth. Then, in step S8, the communication unit 13 executes a communication closing process for canceling the process for establishing a communication circuit, started in step S2. The communication unit 13 then exits the process shown in FIG. 2.

When it is determined in step S6 that status information, related information, and bio-information of the communication terminal at the destination of communications have been received successfully, in step S9, the communication unit 13 obtains status information, related information, and bio-information of the own communication terminal via the controller 2, and supplies the status information, related information, and bio-information to the condition checker 14. Let it be supposed that the information obtained is ((playback, BBBBBBBBBB, music, AAAAAA, contemporary music), (cardiac rate: 68.5)).

Then, in step S10, the condition checker 14 compares the status information, related information, and bio-information of the communication terminal at the destination of communications, obtained in step 5, with the status information, related information, and bio-information of the own communication terminal, obtained in step S9, to check whether predetermined conditions are satisfied. As described earlier, the conditions used in the condition checker 14 can be set in advance. For example, of "'matching of genre' and 'cardiac rate difference: 10'" are set as the conditions.

When the information obtained from the destination of communications is ((playback, YYYYYYYYYY, music, XXXXXX, contemporary music), (cardiac rate: 86.2) and the information of the own communication terminal is ((playback, BBBBBBBBBB, Music, AAAAAA, contemporary music), (cardiac rate 68.5)), the condition of "matching of genre" is satisfied since the genres are both "contemporary music", but the condition of "cardiac rate difference: 10" is not satisfied since the cardiac rate difference is 17.7. That is, the conditions are not satisfied as a whole.

When it is determined in step S10 that the predetermined conditions are not satisfied, in step S11, the communication unit 13 sets a value of "3" to the connection variable, indicating mismatch of conditions. Then, in step S12, the communication unit 13 executes a communication closing process for canceling the communication connecting process started in step S2. Then, the communication unit 13 exits the process shown in FIG. 2.

When it is determined in step S10 that the conditions are satisfied, the call to the destination of communications is maintained with the connection variable maintained at "0", waiting for a user of the communication terminal at the destination of communications to respond to the call. When the user at the destination of communications responds to the call by performing an off-hook operation, a communication circuit is established so that talking is allowed.

Also in the case of the communication terminal 300 according to the third embodiment, the communication connecting process can be requested in two modes. One is a mode in which an address of a destination of connection is specified explicitly, and the other is a mode in which an address group of destinations of communications is specified.

In the former mode, the user attempts to establish a connection by specifying an address of a counterparty. For example, a connection is established only when the genre of the music the counterparty is listening to is the same as the genre of music the user is listening to and the cardiac rate difference is within 10.

In the latter mode, the user specifies an address group of counterparties. For example, when the user specifies an address group of friends, an attempt is made to establish a connection in order from the first address in the group. For example, a connection is formed with a counterparty only when the title of music the party is listening to is the same as the title of music the user is listening to and the cardiac rate difference is within 10. When a connection is not formed, an attempt is made to connect to a next address after a predetermined interval. This operation is repeated until a connection is established with a counterparty. This serves to increase the probability of establishing a communication circuit.

As described above, the communication terminal 300 can grasp whether content is being played back, what type of content is being played back when content is being played back, and bio-information of a user at each of the own communication terminal at the source of communications and a communication terminal at a destination of communications, and establish a communication circuit and carry out communications only when these pieces of information satisfy predetermined conditions.

In this case, more detailed conditions can be used. Thus, communications can be started smoothly, and a communication circuit can be formed and communications can be carried out with a counterparty with which more active and effective communications can be expected.

From the viewpoint of communication terminals that serve as candidates of a destination of communications, a connection is not formed even without making setting for call rejection unless status information, related information, and bio-information satisfy predetermined conditions. Thus, reception of unwanted calls can be avoided.

Fourth Embodiment

In the first to third embodiments described above, information is exchanged between communication terminals, and a communication circuit is established only when a predetermined condition is satisfied. However, instead of checking the condition by the condition checker 14 of each of the communication terminals, the condition may be checked by a server apparatus provided externally.

A fourth embodiment of the present invention relates to a system, apparatus, and method. Similarly to the communication terminals according to the first to third embodiments shown in FIGS. 1, 3, and 5, a communication terminal in the system according to the fourth embodiment includes the content playback system 4 and the bio-information processing system 5. However, the communication terminal in the system according to the fourth embodiment need not include the condition checker 14, which is provided in the communication system 1 in the communication terminals according to the first to third embodiments.

The condition checker 14 provided in the communication system 1 in the communication terminals according to the first to third embodiments shown in FIGS. 1, 3, and 5 is provided as a function of a server that can be accessed by the communication terminal according to the fourth embodiment. Thus, the communication terminal in the system according to the fourth embodiment sends status information detected at the own communication terminal, such as status information, information related to the status information, and bio-information, to the server apparatus, and the server apparatus acts as an intermediary with a communication terminal registered in advance as a counterparty of communications, so that communications can be carried out with a communication terminal at a destination satisfying a predetermined condition.

Figure 6:
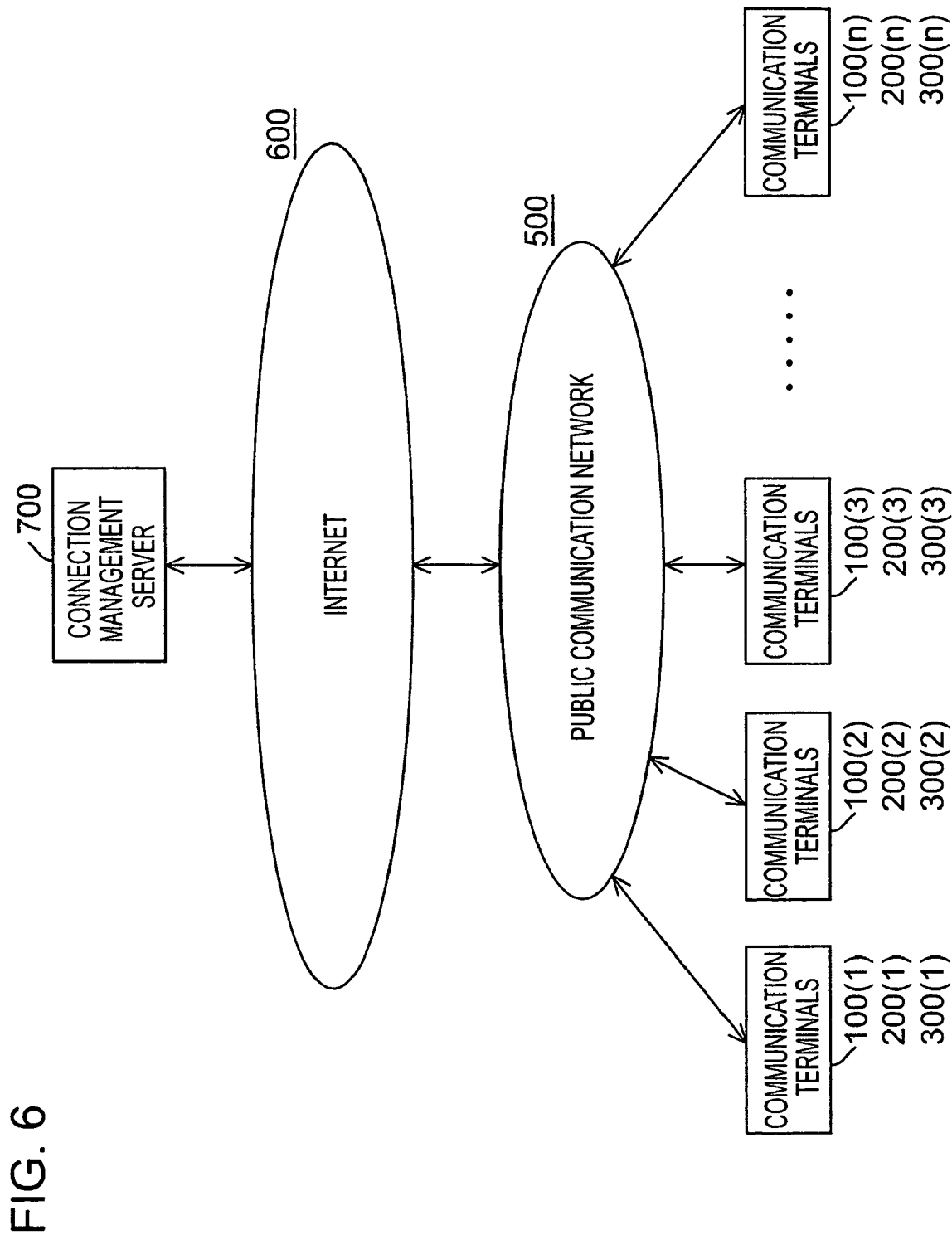
FIG. 6 is a diagram of a system according to another embodiment of the present invention.

FIG. 6 is a diagram for explaining the system and method according to the fourth embodiment. Also in the fourth embodiment, the communication terminal may be various types of devices, for example, personal computers with communication functions, disposed at homes or other places, cellular phones, or portable information communication terminals. For the simplicity of description, however, the fourth embodiment will be described assuming that the communication terminal is a cellular phone terminal.

Referring to FIG. 6, in the system according to the fourth embodiment, communication terminals 100(1), . . . , 200(1), . . . and 300(1), . . . are connected to a connection management server 700 via a public communication network 500, such as a telephone communication network, and the Internet 600.

The communication terminals 100(1), . . . , 200(1), . . . , and 300(1), . . . are configured substantially the same as the communication terminals 100, 200, and 300 according to the first to third embodiments shown in FIGS. 1, 3, and 5. However, as described earlier, the communication terminals 100 (1), . . . 200(1), . . . and 300(1), . . . differ from the communication terminals 100, 200, and 300 according to the first to third embodiments in that the communication system 1 does not include the condition checker 14. Accordingly, the checking of a condition, executed by the condition checker 14 in the communication system 1 of the communication terminals in the first to third embodiments, is executed by the connection management server 700 in the system according to the fourth embodiment.

Since the communication terminals 100(1), . . . , 200(1), and 300(1), . . . are configured the same as the corresponding communication terminals shown in FIGS. 1, 3, and 5 except that the communication system 1 does not include the condition checker 14, the following description will be given also with reference to FIGS. 1, 3, and 5 as needed.

In the fourth embodiment, each of the communication terminals 100(1), 100(2), . . . corresponds to the communication terminal 100 according to the first embodiment shown in FIG. 1. In each of the communication terminals 100(1), 100 (2), . . . , when content data is being played back and used via the content playback system 4 of the own communication terminal, in response to a user's operation via the input unit 3 for requesting searching for an appropriate destination of communications and establishing a connection therewith, the controller 2 generates a connection request including identification information of the own communication terminal, information representing a condition for connection, and information regarding content data being played back by the content playback system 4, such as a title, a content type, an artist name, and a genre of the content being played back, and sends the connection request to the connection management server 700 via the Internet 600 connected via the public communication network 500.

The identification information of the own communication terminal is information that allows unique identification of a communication terminal from which a connection request is transmitted, such as a phone number or a membership number assigned in advance. The information representing a condition for connection represents a predetermined condition for determining whether to establish a communication circuit, such as matching of title, matching of artist, or matching of genre.

As will be described later in detail, the connection management server 700 includes a membership database. The connection management server 700 executes authentication to check whether a communication terminal from which a connection request has been transmitted is a communication terminal of a member registered in the membership database. When the authentication succeeds, the connection management server 700 extracts a candidate of a destination of connection with reference to a connection destination database in which information regarding members with which a communication circuit can be established as a destination of communications is registered, and checks whether content data is being played back at the candidate of connection destination and obtains information such as a title, a content type, an artist name, and a genre when content data is being played back.

Then, the connection management server 700 compares the information regarding the content data being played back at the communication terminal from which the connection request has been transmitted with the information regarding the content data obtained from the communication terminal extracted as a candidate of a connection destination. When these pieces of content data satisfies a predetermined condition represented by the information representing the condition for connection, such as matching of title, matching of artist, or matching of genre, the connection management server 700 acts as an intermediary to establish a communication circuit between the communication terminal from which the connection request has been transmitted (communication terminal at the source of connection) and the communication terminal identified as a destination of connection (communication terminal at the destination of connection). Thus, a communication circuit is established between these communication terminals via the connection management server 700 so that talking is allowed.

Furthermore, in the fourth embodiment, in each of the communication terminals 200(1), 200(2), . . . , when bio-information of a user of the own communication terminal is detected, in response to a user's operation via the input unit 3 for requesting searching for an appropriate destination of communications and establishing a connection therewith, the controller 2 generates a connection request including identification information of the own communication terminal, information representing a condition for connection, and detected bio-information of the user of the own communication terminal, and sends the connection request to the connection management server 700 via the Internet 700 connected via the public communication network 500.

As described earlier, the identification information of the own communication terminal is information that allows unique identification of a communication terminal from which a communication request has been transmitted, such as a phone number or a membership number assigned in advance. The information representing a condition for connection represents a predetermined condition for determining whether to establish a communication circuit, such as a cardiac rate difference of 10 or a pulse rate difference of 10. The bio-information is information that allows identification of a type of bio-information and a value of the bio-information as described in the context of the second embodiment in the form of, for example, (bio-information name: bio-information value 1). More specifically, the bio-information is, for example, (cardiac rate: 86.2).

As described earlier, the connection management server 700 includes a membership database. The connection management server 700 executes authentication to check whether the communication terminal from which the connection request has been transmitted is a communication terminal of a member registered in the membership database. When the authentication succeeds, the connection management server 700 extracts information regarding a candidate of a connection destination with reference to a connection destination database in which information regarding members with which a communication circuit can be established as a destination of communications is registered, and obtains bio-information of a user from the connection destination extracted.

Then, the connection management server 700 compares the bio-information of the user of the communication terminal from which the connection request has been transmitted with the bio-information of the user of the communication terminal obtained from the communication terminal selected as a candidate of a connection destination. When the condition for connection included in the connection request, such as a cardiac rate difference or a pulse rate difference, is satisfied, the connection management server 700 acts as an intermediary to establish a communication circuit between the communication terminal from which the connection request has been transmitted (communication terminal at the source of communications) and the communication terminal identified as a destination of connection (communication terminal at the destination of communications). Thus, a communication circuit can be established and communications can be carried out between these communication terminals via the connection management server 700.

Furthermore, in the fourth embodiment, in each of the communication terminals 300(1), 300(2), . . . , when content data is being played back by the content playback system 4 of the own communication terminal and bio-information of the user of the own communication terminal is detected, in response to a user's operation via the input unit 3 for searching for an appropriate destination of communications and establishing a connection therewith, the controller 2 generates a connection request including identification information of the own communication terminal, information representing a condition of connection, information regarding content data being played back by the content playback system 4, detected bio-information of the user of the own communication terminal, and transmits the connection request to the connection management server 700 via the Internet 600 connected via the public communication network 500.

The information regarding the content data being played back by the content playback system 4 includes information representing a title, a content type, an artist name, a genre, and so forth of the content being played back. The detected bio-information of the user of the own communication terminal allows identification of a type of bio-information and a value of the bio-information in the form of (bio-information name: bio-information value 1) or the like, for example, (cardiac rate: 86.2).

The identification information of the own communication allows unique identification of a communication terminal from which a connection request has been transmitted, as described earlier. The connection condition information includes, for example, a condition regarding content being played back and a condition regarding bio-information, such as "'matching of genre' and 'cardiac rate difference: 10'". Thus, the condition for connection is satisfied when both the condition regarding the content being played back and the condition regarding bio-information are satisfied.

As described earlier, the connection management server 700 includes a membership database. The connection management server 700 executes authentication as to whether a communication terminal from which a connection request has been transmitted is a communication terminal of a member registered in the membership database. When the authentication succeeds, the connection management server 700 extracts a candidate of a connection destination with reference to a connection destination database in which information regarding members with whom communication circuits can be established as destinations of communications is registered. Then, regarding the candidate of a connection destination, the connection management server 700 checks whether content data is being played back, and obtains information regarding the content data, such as a title, a content type, an artist name, and a genre and bio-information of a user of the communication terminal when content data is being played back.

Then, the connection management server 700 compares the information regarding content data and bio-information of the communication terminal from which the connection request has been transmitted with information regarding content data and bio-information of the user of the communication terminal. When these pieces of information match on the basis of the connection condition information, the connection management server 700 acts as an intermediary to establish a communication circuit between the communication terminal from which the connection request has been transmitted (communication terminal at the source of communications) and the communication terminal identified as a connection destination (communication terminal at the destination of communications) so that these communication terminals can communicate with each other via the connection management server 700.

As described above, in the fourth embodiment, the connection management server 700 searches for a communication terminal that serves as a connection destination on the basis of connection condition information, and establishes a communication circuit when the connection condition is satisfied. This serves to reduce the load of communication terminals.

Figure 7:
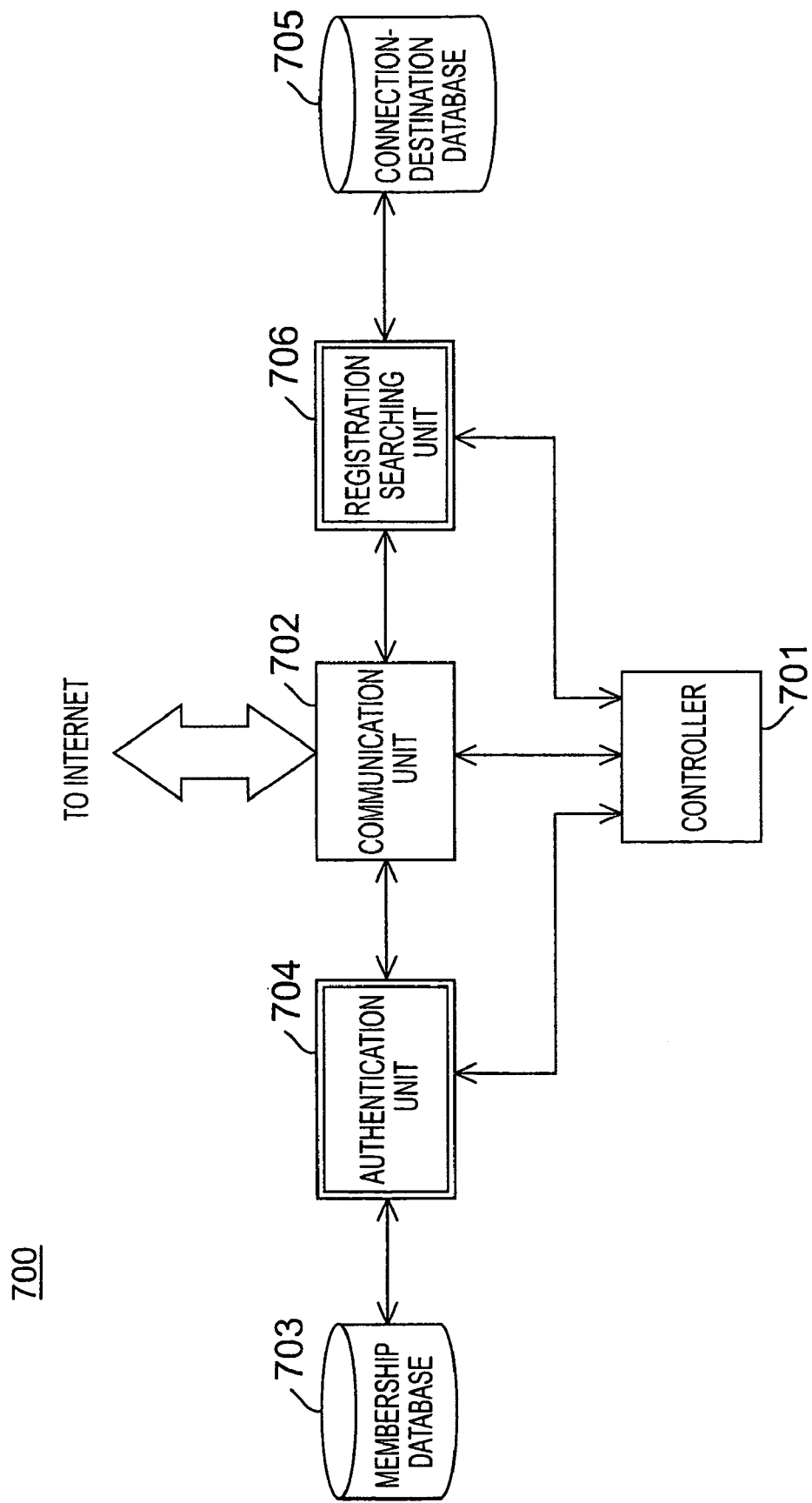
FIG. 7 is a block diagram showing an example configuration of a connection management server apparatus used in the system shown in FIG. 6.

FIG. 7 is a block diagram of the connection management server 700 according to the fourth embodiment. Referring to FIG. 7, the connection management server 700 includes a controller 701, a communication unit 702, a membership database 703, an authentication unit 704, a connection destination database 705, and a registration searching unit 706.

The controller 701 controls parts of the connection management server 700 according to the fourth embodiment.

Although not shown, the controller 701 is implemented by a microcomputer including a CPU, a ROM, a RAM, an EEPROM, and so forth. The communication unit 702 allows connecting to the Internet 600. The communication unit 702 allows receiving information transmitted via the Internet 600 and sending information to the Internet 600.

As described earlier, the membership database 703 stores identification information of members allowed to use functions of the connection management server 700. In the membership database 703, through execution of a procedure for becoming a member by a user of a communication terminal via the Internet 600, information such as identification information of the communication terminal, a name, an address, and a phone number of the user of the communication terminal.

The authentication unit 704, upon receiving a connection request from a communication terminal via the communication unit 702, refers to information accumulated in the membership database 703 to check, on the basis of identification information of a communication terminal included in the connection request, whether it is a connection request from a communication terminal of an authorized user registered in the membership database 703. When it is confirmed that the connection request has been issued by an authorized member (when the authentication succeeds), the authentication unit 704 reports the success of authentication to the controller 701. Thus, the controller 701 can respond only to connection requests from communication terminals of members for which authentication has succeeded.

The connection destination database 705 accumulates information regarding communication terminals that serve as candidates of destinations of communications with which communication circuits are established with a communication terminal of a member in response to a connection request from the communication terminal of the member. For example, a user who has become a member can register (accumulate) in the connection destination database 705 information regarding communication terminals that serve as candidates of destinations of communications. In this case, only the member is allowed to use the information registered in the connection destination database 705.

Furthermore, an administrator of the connection management server 700 can encourage entry of users of communication terminals that serve as connection destinations and accumulate information regarding the communication terminals in the connection destination database 705. In this case, basically, the users of the communication terminals that serve as candidates of connection destinations are not personally acquainted with the user of the communication terminal at the source, and it is possible to establish a connection between communication terminals of member users likely to have similar preferences of content or common topics to talk about.

When a member attempts to carry out communications with another communication terminal while content data is being played back, bio-information of the member is being measured, or content data is being played back and bio-information of the member is being measured, as described earlier, the communication terminal of the member sends a connection request including one of or both information regarding content and bio-information and transmits the connection request to the connection management server 700.

In the connection management server 700, the communication unit 702 receives the connection request from the communication terminal, demodulates the connection request, decomposes the connection request into pieces of information, and supplies identification information to the authentication unit 704. The authentication unit 704 refers to the membership database to check, on the basis of the identification supplied from the communication unit 702, whether the user of the communication terminal from which the connection request has been transmitted is a member, and reports to the controller 701 whether it is confirmed that the user is a member.

When the report from the authentication unit 704 indicates a failure of the authentication, the controller 701 controls the communication unit 702 to send a message indicating that the connection request is not accepted to the source of the request. On the other hand, when the report from the authentication unit 704 indicates a success of the authentication, the controller 701 controls the communication unit 702 to supply identification information representing distinction between a member and a non-member, connection condition information, information regarding content, bio-information, and so forth to the registration searching unit 706.

The registration searching unit 706, under the control of the controller 701, refers to information accumulated in the connection destination database 705 to extract information of a communication terminal that serves as a candidate of a connection destination, and sends a providing request to the communication terminal that serves as a candidate of a connection destination so that information representing a current status be provided therefrom. In response to the providing request, the communication terminal that serves as a destination of a connection destination returns information representing a current status, e.g., whether content data is being played back, information regarding the content when content data is being played back, the type and value of bio-information measured, and so forth.

The information returned from the communication terminal that serves as a destination of communications is received via the communication unit 702 and supplied to the registration searching unit 706. The information returned is, for example, compared with information of a communication terminal at the source of communications, which has been already provided, to check whether the connection condition is satisfied, and the result of the checking is reported to the controller 701. When the result of checking reported from the registration searching unit 706 indicates that the connection condition is satisfied, the controller 701 controls the controller 701 to establish a communication circuit between the communication terminal at the source of communications and the communication terminal at the destination of communications so that talking is allowed.

On the other hand, when the result of checking reported from the registration searching unit 706 indicates that the connection condition is not satisfied, the controller 701 controls the registration searching unit 706 to extracts a next candidate of a connection destination from the connection destination database 705, and sends a providing request that information representing a current status be received. That is, the processing for searching for a destination of communications is repeated.

Although the above description has been given in the context of an example where a communication terminal that serves as a candidate of a destination of communications to request information representing a current status be provided on the basis of information in the connection destination database 705. However, other schemes may be employed. For example, when a communication terminal that serves as a candidate of a destination of communications is not yet chosen as a destination of communication but content data is being played back by the content playback system 4 or bio-information is being measured by the bio-information processing system 5, information representing an own status is transmitted to the connection management server 700 at predetermined timings.

At the connection management server 700, the information is received via the communication unit 702 and is accumulated in the connection destination database 705 via the registration searching unit 706. Thus, the information representing the status of the communication terminal that serves as a candidate of a destination of communications is accumulated in the connection destination database 705 of the connection management server 700. Accordingly, the statuses of non-busy communication terminals that serve as candidates of connection destinations can be managed by the connection management server 700.

Therefore, the connection management server 700 need not each communication terminal that serves as a candidate of a connection destination to report operation status as described earlier, and it is possible to quickly identify a communication terminal that serves as a destination of communications on the basis of information in the connection destination database 705 by the function of the registration searching unit 706, and to establish a communication circuit between the communication terminal at the source of communications and a communication terminal at a destination of communications with which the connection condition is satisfied, thereby allowing talking.

With the connection management server 700 acting as an intermediary as described above, the load of communication terminals is reduced, and it is possible to identify a communication terminal at a destination of communications with which a connection condition is satisfied and to establish a communication circuit with the communication terminal at the destination of communications.

Although the connection management server 700 is provided on the Internet 600 in the example described above, without limitation to the example, a server apparatus may be provided on a telephone circuit network.

According to the first to fourth embodiments described above, information representing a status of a user is automatically obtained, and a connection is not established unless mutual statuses of users satisfy a predetermined condition, so that it is possible to determine whether to establish a communication circuit in accordance with statuses of users at a source and a destination of communications. Thus, active communications between the users can be expected.

Furthermore, application to negative cases is possible, i.e., it is possible to reject connection when not desired. That is, application is possible to both positive cases where a connection is automatically established when mutual statuses are such that active communications can be expected and negative cases where connections are rejected when not desired.
Miscellaneous In the first to fourth embodiments described above, status information and related information are obtained from a communication terminal at a destination of communications, and the status information and related information are compared with status information and related information of a communication terminal at a source of communications. Alternatively, status information and related information may be transmitted from a communication terminal at a source of communications to a communication terminal at a destination of communications so that the communication terminal at the destination of communications can compare the status information and related information received with status information and related information of the own communication terminal to determine whether to quit a connection establishing process.

In the first to fourth embodiments described above, as information reflecting a status of a user, (1) a status of playback of content data, (2) a status of bio-information, (3) a status of playback of content and a status of bio-information at an own communication terminal that serves as a source of communications and a communication terminal that serves as a destination of communications is used, and a communication circuit is established to allow communications when these satisfy predetermined conditions. However, information reflecting a status of a user is not limited to these types of information.

As information reflecting a status of a user, various types of information with which it is possible to estimate a status of a user of an own communication terminal at a source of communications and a status of a user of a communication terminal at a destination of communications may be detected, e.g., an environment status, a movement status, or a location status at the own communication terminal at the source of communications and the communication terminal of the counterparty at the destination of communications. It is possible to set a condition for determining whether to establishing a communication circuit using the information detected as information reflecting a status of the user.

The environment status is a status of an ambient environment of the communication terminal, including various statuses such as temperature, brightness, humidity, noise, and wind velocity. For example, when communication terminals at source and destination of communications both have temperature sensors capable of measuring ambient temperature, a communication circuit can be established between communication terminals with the same ambient temperature. Thus, for example, when one communication terminal is indoors with a heater while the other communication terminal is outdoors at a low temperature in winter, or when one communication terminal is indoors with a cooler while the other communication terminal is outdoors at a high temperature in summer, it is possible not to establish a communication circuit. Thus, it is possible to allow establishing a communication circuit only when both communication terminals are under environments at the same or similar temperatures.

When communication terminals at source and destination of communications both have brightness sensors capable of measuring ambient brightness, it is possible to allow establishing a communication circuit only when both communication terminals are under environments at the same or similar brightnesses. In this case, a communication circuit is not established when, for example, a user of the communication terminal at the source of communications is in a bright place while a user of the communication terminal at the destination of communications is sleeping in a dark room.

When communication terminals at source and destination of communications both have humidity sensors capable of measuring ambient humidity, it is possible to allow establishing a communication circuit only when both communication terminals are under environments at the same or similar humidities. In this case, a communication circuit is not established when, for example, one of the communication terminals is in a room at a relatively low humidity while the other is at a poolside at a relatively high humidity.

When communication terminals at source and destination of communications both have noise sensors capable of measuring ambient noise, it is possible to allow establishing a communication circuit only when both communication terminals are under environments at the same or similar levels of noise. In this case, a communication circuit is not established when, for example, one of the communication terminals is in a quiet place while the other is in a noisy place.

When communication terminals at source and destination of communications both have wind velocity sensors capable of measuring ambient wind velocity, it is possible to allow establishing a communication circuit only when both communication terminals are under environments at the same or similar wind velocities. In this case, a communication circuit is not established when, for example, one of the communication terminals is in a windless place indoors while the other is in a windy place outdoors.

When both communication terminals at source and destination of communications have a timekeeping circuit capable of providing a current time, it is possible to allow establishing a communication circuit only when the current times of locations where the communication terminals are disposed are the same or similar. Thus, for example, when the communication terminals at the source and destination are located in regions of different current times, it is possible to allow establishing a communication circuit when the time difference between the communication terminals is within a predetermined time difference while otherwise not allowing establishing a communication circuit.

In this case, it is also possible not to establish a communication circuit only when the current time indicated by the timekeeping circuit of the communication terminal at the destination of communications is in a time range not suitable for communications, such as midnight or early morning. As described above, it is possible to determine whether to establish a communication circuit on the basis of a predetermined condition regarding information regarding a status of a destination of communication, without using information representing statuses of both communication terminals (information that allows estimation of statuses).

When the communication terminal at the source of communications and the communication terminal at the destination of communications are under the same or similar environments, it can be estimated that users of these communication terminals are under the same or similar environments. Thus, few factors that inhibit communications exist, and it is possible to estimate environments of both users in advance. Accordingly, active communications such as talking can be expected.

The movement status is a status regarding whether a communication terminal is moving, the speed of movement of the communication terminal, and so forth. These statuses can be detected using an acceleration sensor, an angular velocity sensor, and so forth. It is possible to allow establishing a communication circuit between a communication terminal at a source of communications and a communication terminal at a destination of communications when these communication terminals are both still, moving at the same speed, or moving at speeds with a speed difference within a predetermined range.

Accordingly, for example, it is possible to allow establishing a communication network when both communication terminals are still or moving at similar speeds, while not establishing a communication circuit when one is still and the other is moving or when both are moving but one is moving at a speed of walking while the other is moving by an automobile since the communication terminals are in different circumstances.

In this case, it is possible to prohibit connection when, for example, the speed of movement corresponds to a speed of an automobile, a motorbike, or a train even when the difference between the speeds of movement of the communication terminals is within a predetermined range, in consideration of safety and public manner. That is, it is possible to set a connection condition regarding an upper limit of movement speed used for comparison.

The location information relates to a location of a communication terminal at a source of communications and a location of a communication terminal at a destination of communications, such as current locations and altitudes of the communication terminals at the source and destination of communications. These pieces of information can be grasped by a positioning system such as the Global Positioning System (GPS) and map information. GPS devices are recently becoming smaller so that GPS devices can be mounted on portable communication terminals. Furthermore, it is possible to grasp a current location of a communication terminal on the basis of status of reception of radio waves from one or more base stations in a portable phone communication network and locations of the base stations.

It is possible to establish a communication circuit when the communication terminal at the source of communications and the communication terminal at the destination of communications are both located in a certain range, for example, when both communication terminals are located in a baseball field, a soccer filed, or an amusement park. Also, it is possible to establish a communication circuit when the distance between the communication terminal at the source of communications and the communication terminal at the destination of communications is within a predetermined distance while otherwise not establishing a communication circuit.

Also, it is possible to allow establishing a communication circuit when both communication terminals are at similar altitudes while not establishing a communication circuit when the difference between the altitudes of the communication terminals is not within a predetermined range. Thus, for example, when one communication terminal is used in a city region at a relatively low altitude while the other is used in a mountain region at a relatively high altitude, it is estimated that the status of usage environment differs considerably, so that a communication circuit is not established between the communication terminals.

As described above, by setting connection conditions regarding environment statuses, movement statuses, location statuses, or the like of source and destination of communications, it is possible to allow establishing a communication circuit and carrying out communications only when the conditions are satisfied. That is, when the connection conditions are satisfied, it is estimated that the user of the communication terminal at the source of connection and the user of the communication terminal at the destination of connection are in the same or similar states. Thus, when a communication circuit is established, communications such as talking can be carried out smoothly, so that active communications can be expected.

Although the embodiments have been described above in the context of examples where communication terminals carry out one-to-one communications, without limitation to one-to-one communications, communications can be carried out by establishing communication circuits simultaneously between a single communication terminal at a source and a plurality of communication terminals at destinations. In this case, for example, a connection management server acts as an intermediary so that it is possible to establish communication circuits simultaneously between a single communication terminal at a source and a plurality of communication terminals at destinations.

Furthermore, although the embodiments have been described in the context of phone calls in which audio signals are exchanged between communication terminals. However, without limitation to audio signals, data communications may be carried out to exchange text information or image information, and it is also possible to carry out both phone calls and data communications.

Furthermore, although the communication terminals in the embodiments have been described in the context of devices for talking, such as cellular phone terminals, without limitation to cellular phone terminals, the communication terminals may be applied to various types of electronic devices having communication functions, such as personal computers having communication functions or personal digital assistants (PDAs) having communication functions. Obviously, the communication terminals may be portable terminals or fixed terminals.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising:
   a source communication terminal;
   one or more destination communication terminals; and
   a server apparatus connected to the source communication terminal and the destination communication terminal via a predetermined network;
   wherein the source communication terminal comprises:
      detecting means for detecting source-status information reflecting a status of a user of the source communication terminal,
      accepting means for accepting input of an instruction by the user, and
      sending-information generating means for sending a connection request for establishing a communication circuit and the source-status information detected by the detecting means to the server apparatus when input of an instruction for carrying out communications is accepted via the accepting means;
   wherein the server apparatus comprises
      information accepting means for accepting the connection request and the source-status information from the source communication terminal,
      request generating means for generating a providing request and sending the providing request to a destination communication terminal at an intended destination based on the connection request accepted via the information accepting means, the providing request requesting that destination-status information reflecting a status of a user of the destination communication terminal be provided,
      condition checking means for checking whether a predetermined condition is satisfied by comparing the destination-status information transmitted from the destination communication terminal in response to the providing request with the source-status information transmitted from the source communication terminal, and
      connection controlling means for establishing a communication circuit between the source communication terminal and the destination communication terminal when it is determined by the condition checking means that the condition is satisfied; and
   wherein each of the one or more destination communication terminals comprises:
      detecting means for detecting destination-status information reflecting a status of a user,
      request accepting means for accepting a providing request from the server apparatus, and
      information returning means for sending the destination-status information detected by the detecting means to the server apparatus when the providing request from the server apparatus is accepted via the request accepting means.

2. A server apparatus in a communication system in which a source communication terminal and one or more destination communication terminals are connected to the server apparatus via a predetermined network, the server apparatus comprising:
   information accepting means for accepting a connection request and source-status information reflecting a status of a user of the source communication terminal, the connection request and the source-status information being transmitted from the source communication terminal;
   request generating means for generating a providing request and sending the providing request to a destination communication terminal at an intended destination based on the connection request accepted via the information accepting means, the providing request requesting that destination-status information reflecting a status of a user of the destination communication terminal be provided;
   condition checking means for checking whether a predetermined condition is satisfied by comparing the destination-status information transmitted from the destination communication terminal in response to the providing request with the source-status information transmitted from the source communication terminal; and
   connection controlling means for establishing a communication circuit between the source communication terminal and the destination communication terminal when it is determined by the condition checking means that the condition is satisfied.

3. A communication connecting method in a communication system in which a source communication terminal and one or more destination communication terminals are connected to a server apparatus via a predetermined network, the communication connecting method comprising the steps of:
   detecting source-status information reflecting a status of a user at the source communication terminal;
   sending a connection request for establishing a communication circuit and the source-status information detected in the detecting step from the source communication terminal to the server apparatus;
   generating a providing request at the server apparatus and sending the providing request to a destination communication terminal at an intended destination when the connection request from the source communication terminal is received, the providing request requesting that destination-status information reflecting a status of a user of the destination communication terminal be provided;
   detecting the destination-status information reflecting the status of the user at the destination communication terminal when the providing request from the server apparatus is received;
   sending the destination-status information detected from the destination communication terminal to the server apparatus;
   checking at the server apparatus whether a predetermined condition is satisfied by comparing the destination-status information transmitted from the destination communication terminal in response to the providing request with the source-status information transmitted from the source communication terminal; and establishing, by the server apparatus, a communication circuit between the source communication terminal and the destination communication terminal when it is determined in the condition checking step that the condition is satisfied.

4. A communication system comprising:

a source communication terminal;

one or more destination communication terminals; and a server apparatus connected to the source communication terminal and the destination communication terminal via a predetermined network;

wherein the source communication terminal comprises:
- a detector configured to detect source-status information reflecting a status of a user of the source communication terminal,
- an accepting unit configured to accept input of an instruction by the user, and
- a sending-information generator configured to send a connection request for establishing a communication circuit and the source-status information detected by the detector to the server apparatus when input of an instruction for carrying out communications is accepted via the accepting unit;

wherein the server apparatus comprises:
- an information accepting unit configured to accept the connection request and the source-status information from the source communication terminal,
- a request generator configured to generate a providing request and to send the providing request to a destination communication terminal at an intended destination based on the connection request accepted via the information accepting unit, the providing request requesting that destination-status information reflecting a status of a user of the destination communication terminal be provided,
- a condition checker configured to check whether a predetermined condition is satisfied by comparing the destination-status information transmitted from the destination communication terminal in response to the providing request with the source-status information transmitted from the source communication terminal, and
- a connection controller configured to establish a communication circuit between the source communication terminal and the destination communication terminal when it is determined by the condition checker that the condition is satisfied; and wherein each of the one or more destination communication terminals comprises:
- a detector configured to detect destination-status information reflecting a status of a user,
- a request accepting unit configured to accept a providing request from the server apparatus, and
- an information returning unit configured to send the destination-status information detected by the detector to the server apparatus when the providing request from the server apparatus is accepted via the request accepting unit.

5. A server apparatus in a communication system in which a source communication terminal and one or more destination communication terminals are connected to the server apparatus via a predetermined network, the server apparatus comprising:

an information accepting unit configured to accept a connection request and source-status information reflecting a status of a user of the source communication terminal, the connection request and the source-status information being transmitted from the source communication terminal;

a request generator configured to generate a providing request and to send the providing request to a destination communication terminal at an intended destination based on the connection request accepted via the information accepting unit, the providing request requesting that destination-status information reflecting a status of a user of the destination communication terminal be provided;

a condition checker configured to check whether a predetermined condition is satisfied by comparing the destination-status information transmitted from the destination communication terminal in response to the providing request with the source-status information transmitted from the source communication terminal; and a connection controller configured to establish a communication circuit between the source communication terminal and the destination communication terminal when it is determined by the condition checker that the condition is satisfied.

* * * * *